(12) United States Patent
Matsuda

(10) Patent No.: US 9,594,448 B2
(45) Date of Patent: Mar. 14, 2017

(54) INPUT DEVICE, CONTROL METHOD AND PORTABLE TERMINAL DEVICE

(71) Applicant: KYOCERA Corporation, Kyoto-shi, Kyoto (JP)

(72) Inventor: Munehito Matsuda, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 85 days.

(21) Appl. No.: 14/411,378

(22) PCT Filed: Jun. 26, 2013

(86) PCT No.: PCT/JP2013/003991
§ 371 (c)(1),
(2) Date: Dec. 24, 2014

(87) PCT Pub. No.: WO2014/002490
PCT Pub. Date: Jan. 3, 2014

(65) Prior Publication Data
US 2015/0138109 A1    May 21, 2015

(30) Foreign Application Priority Data
Jun. 26, 2012  (JP) .................. 2012-142663

(51) Int. Cl.
*G06F 3/041* (2006.01)
*G06F 3/045* (2006.01)
(Continued)

(52) U.S. Cl.
CPC ............ *G06F 3/0412* (2013.01); *G06F 3/016* (2013.01); *G06F 3/017* (2013.01); *G06F 3/04883* (2013.01); *G06F 3/04886* (2013.01)

(58) Field of Classification Search
CPC .......................... G06F 3/04842; G06F 3/0488
See application file for complete search history.

(56) References Cited

U.S. PATENT DOCUMENTS

2008/0296072 A1   12/2008  Takashima et al.
2009/0322695 A1*  12/2009  Cho ...................... G06F 3/0416
                                                              345/173
(Continued)

FOREIGN PATENT DOCUMENTS

JP          4046095 B2      2/2008
JP          4808804 B2     11/2011
JP       2012-038289 A      2/2012

OTHER PUBLICATIONS

International Search Report dated Sep. 10, 2013, issued in counterpart International application No. PCT/JP2013/003991.

*Primary Examiner* — Alexander Eisen
*Assistant Examiner* — Nan-Ying Yang
(74) *Attorney, Agent, or Firm* — Procopio Cory Hargreaves and Savitch LLP

(57) ABSTRACT

A touch panel (111) includes: a touchpad unit (111*a*) that repeatedly detects a touch position touched by operation body; a speed calculation unit that calculates movement speed of the operation body; a vibrator (111*f*); and a region setting unit (111*c*), when the speed at first time is less than threshold, sets first reaction region to be anterior in movement direction of the operation body, and when the speed is equal to or greater than the threshold, sets second reaction region that is smaller than the first reaction region to be anterior in the direction; and a vibration control unit (111*e*) that judges whether the operation body is inside the reaction region at second time after the reaction region setting, when the operation body is inside the reaction region, controls the vibrator to vibrate, and when the operation body is not inside the reaction region, controls the vibrator not to vibrate.

8 Claims, 22 Drawing Sheets

(51) Int. Cl.
*G06F 3/01* (2006.01)
*G06F 3/0488* (2013.01)

(56) References Cited

U.S. PATENT DOCUMENTS

| 2010/0079388 A1* | 4/2010 | Ohnishi .............. G06F 3/04883 345/173 |
| 2011/0161810 A1* | 6/2011 | Stallings ................ G06F 3/016 715/702 |
| 2012/0162114 A1 | 6/2012 | Inoue et al. |

* cited by examiner

FIG. 3A

Initial region table 120a

| Initial region information |||||
|---|---|---|---|---|
| Initial region identifier | Position | Size ||
| ^ | ^ | Height | Width |
| ID1 | (50, 100) | 32 | 32 | — 121 |
| ID2 | (100, 100) | 32 | 32 | — 122 |
| ⋮ | ⋮ | ⋮ | ⋮ ||

FIG. 3B

Reaction region table 140

| Reaction region information |||||
|---|---|---|---|---|
| Reaction region identifier | Position | Size ||
| ^ | ^ | Height | Width |
| ID1 | (50, 100) | 32 | 32 | — 141 |
| ID2 | (100, 100) | 32 | 32 | — 142 |
| ⋮ | ⋮ | ⋮ | ⋮ ||

(a)

(b)

(c)

(d)

(a)

(b)

(c)

(a)

(b)

(c)

(d)

(a)

(b)

(c)

(d)

(a)

(b)

(c)

(d)

(a)

(b)

(c)

(d)

(a)

(b)

(c)

(d)

(a)

(b)

(c)

(a)

(b)

(c)

(a)

(b)

(c)

INPUT DEVICE, CONTROL METHOD AND PORTABLE TERMINAL DEVICE

TECHNICAL FIELD

The present invention relates to an art of vibrating to inform a user of that an operation body touches a region on an operation screen, the region being for receiving an operation instruction allocated to the region.

BACKGROUND ART

In recent years, a touch panel having a touch sensor has been widely used as an input device for receiving a user's input operation in mobile terminal devices such as mobile phone devices, home electric appliances, industrial equipment, and so on.

Also, in order to improve operability by giving a pseudo sense of touch to an operator, there has been disclosed an art of detecting a speed of an operation body that moves on an operation screen while being in touch with the operation screen, and causing vibration at a detection time of the speed in accordance with the detected speed.

SUMMARY OF INVENTION

Technical Problem

The above related art is also applicable to the case where a plurality of operation screens are arranged with space therebetween in an input device included in mobile terminal devices such as mobile phone devices, home electric appliances, industrial equipment, and so on.

However, fast movement of the operation body reduces a time period of the operation body moving between a first operation screen and a second operation screen that are adjacent to each other. Accordingly, an end time of a first vibration occurring in response to touch to the first operation screen is close to a start time of a second vibration occurring in response to touch to the second operation screen. This sometimes makes it difficult to distinguish between the first vibration and the second vibration.

In view of this, there is a demand for an input device, a control method, a recording medium, and a mobile terminal device that are capable of, even in the case where the operation body moves at a high speed, making a user to distinguish one vibration from an immediately previous vibration thereof.

Solution to Problem

One aspect of the present invention provides an input device that vibrates to inform a user of that an operation body touches a region on a screen, the region being for receiving an operation instruction allocated to the region, the input device comprising: a touch position detection module configured to repeatedly detect a touch position on the screen touched by the operation body while the operation body is in touch with the screen; a speed calculation module configured to calculate a movement speed at each detected touch position, the movement speed indicating a speed at which the operation body moves on the screen while being in touch with the screen; a vibrator; a region setting module configured to compare the movement speed at a touch position detected at a first time point with a threshold value, (i) when the movement speed is less than the threshold value, set a first reaction region on the screen so as to be positioned anterior to the detected touch position in a movement direction of the operation body, and (ii) when the movement speed is equal to or greater than the threshold value, set a second reaction region on the screen so as to be positioned anterior to the detected touch position in the movement direction, the second reaction region being smaller than the first reaction region; and a vibration control module configured to judge whether the operation body is positioned inside the set reaction region, with use of a touch position detected at a second time point after the reaction region is set, when the operation body is positioned inside the set reaction region, control the vibrator to vibrate, and when the operation body is not positioned inside the set reaction region, control the vibrator not to vibrate.

Advantageous Effects of Invention

According to the above aspect, when the movement speed at the detected touch position is equal to or greater than the threshold value, the second reaction region, which is smaller than the first reaction region, is set on the screen so as to be positioned anterior to the detected touch position in the movement direction. Also, when the operation body is positioned inside the second reaction region after the second reaction region is set, the vibrator vibrates. Accordingly, it is possible to provide a temporal interval between a start time point of vibration occurring in response to touch to the second reaction region and an end time point of an immediately previous vibration thereof. This allows the user to distinguish between the vibration occurring in response to touch to the second reaction region and the immediately previous vibration.

BRIEF DESCRIPTION OF DRAWINGS

FIG. 3A shows an example of data structure of an initial region table 120a, and FIG. 3B shows an example of data structure of a reaction region table 140.

DESCRIPTION OF EMBODIMENTS

1. Embodiment

The following describes a mobile terminal device 100 as an embodiment relating to the present invention.

The mobile terminal device 100 is configured to be capable of performing call and transmission and reception of electronic mails with other mobile terminal devices and mobile phone devices via a base station and a mobile phone network which are not illustrated. Also, the mobile terminal device 100 is capable of serving a function of each of application programs by executing the application program. The functions of the application programs include, for example, call, transmission and reception of electronic mails, music playback, movie playback, calendar display, alarm setting and notification, word searching with use of a dictionary, text display and input, and so on.

Figure 1:
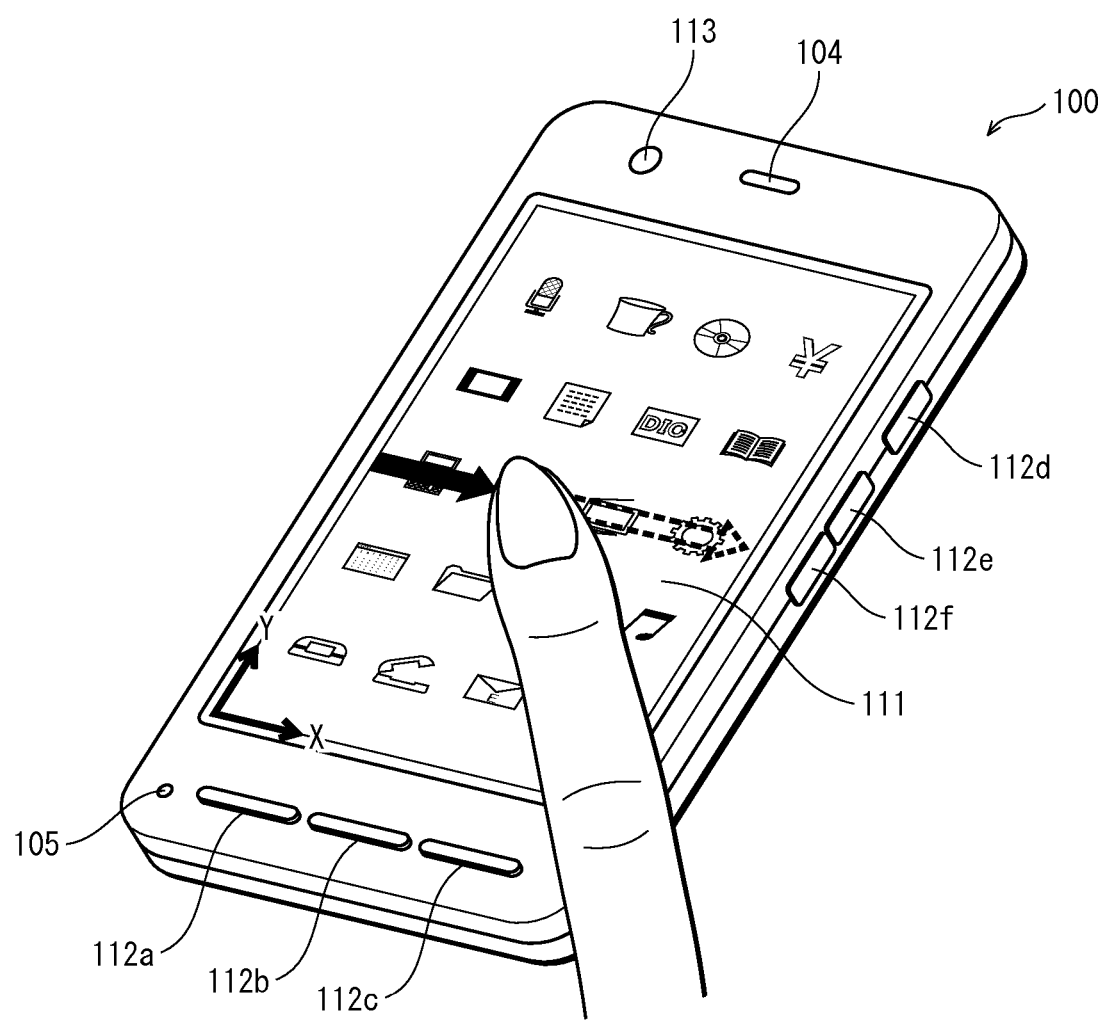
FIG. 1 is a perspective view showing outer appearance of a mobile terminal device 100 as an embodiment relating to the present invention.

As shown in FIG. 1, the mobile terminal device 100 has a touch panel 111 arranged on a front side thereof such that an operation screen is exposed. A plurality of icons are displayed on the touch panel 111 such as shown in the figure. The icons each clearly represent contents of the above application programs by figure, picture, or the like. The icons each correspond to an application program, and are used by a user for starting the corresponding application program. A reaction region is set at a position on the operation screen at which a corresponding icon is positioned. In an initial state, the reaction region is generated so as to have substantially the same size as the corresponding icon. In the case where a plurality of icons are displayed on the operation screen, one reaction region exists for each icon. Here, the X-axis is defined to be along the short side of the operation screen, and the Y-axis is defined to be along the long side of the operation screen and be perpendicular to the X-axis.

The user slides an operation body such as the user's finger for movement on the operation screen of the touch panel 111 while causing the operation body in touch with the operation screen. When detecting that a touch position touched by the operation body is positioned inside a reaction region corresponding to an icon, the mobile terminal device 100 controls a vibrator included therein to vibrate. The user detects whether the mobile terminal device 100 is vibrating, and thereby knows whether the operation body on the operation screen is positioned on the icon or not positioned on the icon. The user taps a position on the operation screen that is in touch with the operation body while the mobile terminal device 100 is vibrating, and this starts an application program allocated to the icon.

In this way, the touch panel 111 vibrates to inform a user of that the operation body touches a region on the operation screen, the region being for receiving an operation instruction allocated to the region.

1.1 Configuration of Mobile Terminal Device 100

Figure 2:
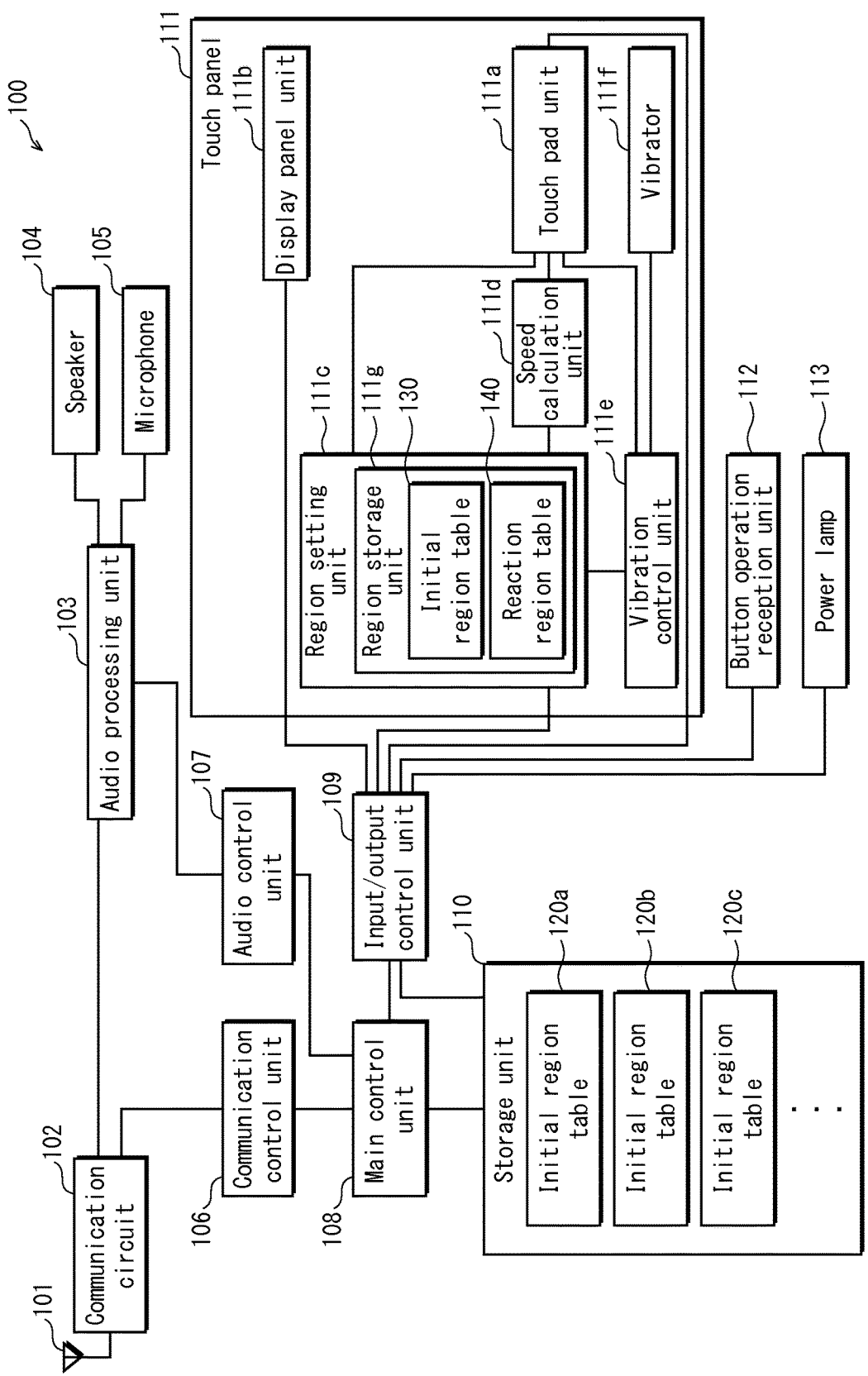
FIG. 2 is a block diagram showing configuration of the mobile terminal device 100.

The mobile terminal device 100 includes, as shown in FIG. 2, an antenna 101, a communication circuit 102, an audio processing unit 103, a speaker 104, a microphone 105, a communication control unit 106, an audio control unit 107, a main control unit 108, an input/output control unit 109, a storage unit 110, a touch panel 111, a button operation reception unit 112, and a power lamp 113.

(1) Storage Unit 110

As shown in FIG. 2, the storage unit 110 stores therein a plurality of initial region tables 120a, 120b, 120c, .... The storage unit 110 further stores therein the application programs, image data, and other data.

(Initial Region Tables 120a, 120b, 120c, ...)

The initial region tables 120a, 120b, 120c, ... are each a data table for defining an initial region that is an initial state of a reaction region corresponding to an icon. The reaction region is generated from the initial region which is defined by each of the initial region tables. Although described later, the reaction region is generated by reducing the initial region or by using an initial region with no reduction.

The initial region tables 120a, 120b, 120c, ... one-to-one correspond to a plurality of icon menus. The icon menus each include one or more icons. For example, the initial region table 120a corresponds to an icon menu that is displayed immediately after power-on of the mobile terminal device 100. Also, the initial region table 120b corresponds to an icon menu for performing operations such as transmission, reception, settings, and so on of electronic mails. Furthermore, the initial region table 120c corresponds to an icon menu for performing various types of settings in the mobile terminal device 100.

FIG. 3A shows an example of data structure of the initial region table 120a. Note that the other initial region tables 120b, 120c, ... have the same data structure as the initial region table 120a, and accordingly description thereof is omitted.

The initial region table 120a has a plurality of pieces of initial region information. The pieces of initial region information one-to-one correspond to initial regions of the icons included in the corresponding icon menu. In other words, the pieces of initial region information included in the initial region table 120a are equal in number to the icons included in the icon menu corresponding to the initial region table 120a. The pieces of initial region information are each composed of an initial region identifier, position, and size.

The initial region identifier is identification information identifying a corresponding initial region. The position indicates an upper left position in the initial region on the operation screen, and is expressed by an X-coordinate value and a Y-coordinate value. The size includes height and width respectively indicating length in the Y-axis direction and length in the X-axis direction of the initial region.

The initial region is rectangular here. However, the shape of the initial region is not limited to this. Alternatively, the initial region may be for example polygonal, circular, oval, or the like. Further alternatively, the initial region may have the same shape as the corresponding icon. In the case where the initial region has such a shape, the initial region information, which is included in the initial region table, should include information for specifying position and shape of the initial region.

As shown in FIG. 3A as an example, the initial region table 120a includes initial region information 121 and initial region information 122.

The initial region information 121 includes initial region identifier "ID1", position "(50,100)", and height "32" and width "32" as size. This means that an upper left position on an initial region identified by the initial region identifier "ID1" is expressed by coordinate values (50,100), height of 32 dots, and width of 32 dots.

Also, the initial region information 122 includes initial region identifier "ID2", position "(100,100)", and height "32" and width "32" as size. This means that an upper left position of an initial region identified by the initial region identifier "ID2" is expressed by coordinate values (100,100), height of 32 dots, and width of 32 dots.

(2) Touch Panel 111

The touch panel 111 includes a touch pad unit 111a, a display panel unit 111b, a region setting unit 111c, a speed calculation unit 111d, a vibration control unit 111e, and a vibrator 111f. The display panel unit 111b has a rectangular display screen to which the touch pad unit 111a is attached. Also, the vibrator 111f is provided on a reverse surface of the display panel unit 111b so as to be in touch with the display panel unit 111b.

(2-1) Display Panel Unit 111b

The display panel unit 111b is for example a liquid crystal display.

The display panel unit 111b receives one or more images and position data indicating a display position of each of the images from the main control unit 108 via the input/output control unit 109. Then, the display panel unit 111b displays the received image on the position indicated by the position data.

The image is for example an icon. The icon is used for starting an application program to be operated on the mobile terminal device 100.

(2-2) Touch Pad Unit 111a

The touch pad unit 111a repeatedly detects a touch position on the operation screen touched by the operation body while the operation body is in touch with the operation screen, as shown below.

When the operation body touches the operation screen of the touch pad unit 111a, the touch pad unit 111a detects a touch position touched by the operation body for each predetermined time interval, for example at 50 m second intervals. Note that intervals for detection of a touch position is not limited to 50 m second intervals. Alternatively, the touch pad unit 111a may for example detect the touch position at 75 m second intervals or at 100 m second intervals. Next, each time the touch pad unit 111a detects a touch position, the touch pad unit 111a generates position information indicating the touch position (an X-coordinate value and a Y-coordinate value).

The user slides the operation body for movement on the touch pad unit 111a while causing the operation body in touch with the touch pad unit 111a. Then, the touch pad unit 111a continuously detects touch positions touched by the operation body to generate respective pieces of position information indicating the touch positions.

Then, each time the touch pad unit 111a detects a touch position, the touch pad unit 111a outputs a detection time at which the touch position has been detected and the generated position information to the speed calculation unit 111d. Also, the touch pad unit 111a outputs the generated position information as an input signal to the region setting unit 111c, the vibration control unit 111e, and the input/output control unit 109.

In this way, the touch pad unit 111a repeatedly detects a touch position on the operation screen touched by the operation body. Each time the touch pad unit 111a detects a touch position, the touch pad unit 111a outputs position information indicating the detected touch position.

(2-3) Speed Calculation Unit 111d

The speed calculation unit 111d calculates a touch movement speed at each touch position as shown below. The touch movement speed indicates a speed at which the operation body moves on the operation screen while being in touch with the operation screen.

The speed calculation unit 111d has a position information storage region for storing up to five pairs of detection time and position information. However, the number of pairs of detection time and position information to be stored is not limited to five. Alternatively, six or more pairs of detection time and position information may be stored in the position information storage region. Further alternatively, two or more and less than five pairs of detection time and position information may be stored in the position information storage region.

The speed calculation unit 111d calculates a touch movement speed of the operation body as shown below.

Each time a touch position is detected by the touch pad unit 111a, the speed calculation unit 111d receives a pair of detection time and position information, and writes the received pair of detection time and position information into the position information storage region. The position information storage region includes sub-regions for storing five pairs of detection time and position information. Accordingly, in the case where all the sub-regions included in the position information storage region each have already stored therein a pair of detection time and position information, the speed calculation unit 111d writes a newly received pair of detection time and position information over a pair of the earliest detection time and position information.

Next, the speed calculation unit 111d calculates a touch movement speed v of the operation body from the following equation with use of all the pairs of detection time and position information stored in the position information storage region. Note that the touch movement speed v to be calculated corresponds to a reception time of a pair of the latest detection time and position information.

Touch movement speed $v$=Movement distance/Necessary time period

Here, the movement distance indicates a distance between a position indicated by the position information which is paired with the earliest detection time and a position indicated by the position information which is paired with the latest detection time among the positions stored in the position information storage region. The necessary time period indicates a differential time period between the earliest detection time and the latest detection time.

Note that calculation is performed without using a pair of a detection time that is earlier than the latest detection time by 300 m seconds or more and position information, for example. This is because there is a possibility that if the touch movement speed is calculated with use of such a pair of a detection time earlier than the latest detection time by 300 m seconds or more and the position information, it is impossible to precisely calculate a touch movement speed of the operation body at a reception time of the pair of detection time and position information.

Next, the speed calculation unit 111d outputs the calculated touch movement speed v to the region setting unit 111c.

(2-4) Region Setting Unit 111c

When the touch movement speed v on a touch position detected at a first time point is less than a threshold value, the region setting unit 111c sets a first reaction region on the operation screen so as to be positioned anterior to the detected touch position in the touch movement direction. On the other hand, when the touch movement speed v is equal to or greater than the threshold value, the region setting unit 111c sets a second reaction region on the operation screen so as to be positioned anterior to the detected touch position in the touch movement direction. The second reaction region is smaller than the first reaction region. Specific examples of the threshold value here include a first threshold value v1, a second threshold value v2, and a third threshold value v3 which are described later. Also, description is given later on specific examples of the first reaction region and the second reaction region.

(a) The region setting unit 111c includes a region storage unit 111g. The region storage unit 111g has a region for storing one initial region table 130 and one reaction region table 140.

The initial region table 130 has the same data structure as the initial region tables 120a, 120b, 120c, . . . stored in the storage unit 110.

FIG. 3B shows an example of data structure of the reaction region table 140.

The reaction region table 140 has one or more pieces of reaction region information. The pieces of reaction region information one-to-one correspond to reaction regions of icons included in an icon menu that is being displayed. The pieces of reaction region information are each composed of a reaction region identifier, position, and size.

The reaction region identifier is identification information identifying a reaction region. The position indicates an upper left position in the reaction region on the operation screen, and is expressed by an X-coordinate value and a Y-coordinate value. The size includes height and width respectively indicating length in the Y-axis direction and length in the X-axis direction of the reaction region.

The reaction region is rectangular here. However, the shape of the reaction region is not limited to this. Alternatively, the reaction region may be for example polygonal, circular, oval, or the like. Further alternatively, the reaction region may have the same shape as the corresponding icon. In the case where the initial region has such a shape, the reaction region information, which is included in the reaction region table, should include information specifying position and shape of the reaction region.

As shown in FIG. 3B as an example, the reaction region table 140 includes reaction region information 141 and reaction region information 142.

The reaction region information 141 includes reaction region identifier "ID1", position "(50,100)", and height "32" and width "32" as size. This means that an upper left position on a reaction region identified by the reaction region identifier "ID1" is expressed by coordinate values (50,100), height of 32 dots, and width of 32 dots.

Also, the reaction region information 142 includes reaction region identifier "ID2", position "(100,100)", and height "32" and width "32" as size. This means that an upper left position on a reaction region identified by the reaction region identifier "ID2" is expressed by coordinate values (100,100), height of 32 dots, and width of 32 dots.

Also, the region setting unit 111c stores therein the first threshold value v1, the second threshold value v2, and the third threshold value v3 that are each a speed threshold value to be compared with the touch movement speed of the operation body. The first threshold value v1 is less than the second threshold value v2. The second threshold value v2 is less than the third threshold value v3.

(b) The region setting unit 111c receives one initial region table from the input/output control unit 109. The initial region table received here has been read from the storage unit 110, and corresponds to an icon menu to be displayed. Also, each time a touch movement speed v is calculated by the speed calculation unit 111d, the region setting unit 111c receives the calculated touch movement speed v from the speed calculation unit 111d. Furthermore, each time a touch position is detected by the touch pad unit 111a, the region setting unit 111c receives position information indicating the detected touch position from the touch pad unit 111a.

(c) In the case where the initial region table 130 has already been stored in the region storage unit 111g at a time when the region setting unit 111c receives one initial region table from the input/output control unit 109, the region setting unit 111c deletes the stored initial region table 130. Also, in the case where the reaction region table 140 has already been stored in the region storage unit 111g at a time when the region setting unit 111c receives the one initial region table, the region setting unit 111c deletes the stored reaction region table 140. Then, the region setting unit 111c writes the received initial region table into the region storage unit 111g as a new initial region table 130.

(d) Upon receiving the position information and the touch movement speed v, the region setting unit 111c reads initial region information from the initial region table 130 as shown below.

Each time a touch position is detected by the touch pad unit 111a, the region setting unit 111c receives position information indicating the detected touch position from the touch pad unit 111a, as described above. The user slides the operation body for movement on the operation screen of the touch pad unit 111a while causing the operation body in touch with the operation screen. In such a case, the touch pad unit 111a continuously outputs a plurality of pieces of position information, and the region setting unit 111c continuously receives the pieces of position information.

Next, the region setting unit 111c calculates predicted track information with use of the received pieces of position information. The predicted track information indicates a predicted track the operation body is predicted to follow subsequent to the touch position indicated by the piece of position information which has been lastly received. Here, the respective touch positions indicated by the received pieces of position information are assumed to approximately form a straight line. Also, the predicted track is assumed to approximately be a straight line that is coincident with the straight line formed by the touch positions. Based on these assumptions, the region setting unit 111c approximately calculates one straight line by the method of least squares with use of the received pieces of position information, and determines the calculated straight line as the predicted track. Note that approximation of the predicted track is not limited to linear approximation, and alternatively curve approximation may be employed.

Next, the region setting unit 111c reads, from the initial region table 130, initial region information defining an initial region that intersects with the calculated predicted track. When a plurality of icons are arranged anterior to the operation body on the operation screen in the touch movement direction of the operation body, the region setting unit 111c reads pieces of initial region information that are equal in number to the icons.

(e) Next, the region setting unit 111c compares the received touch movement speed v with each of the first threshold value v1, the second threshold value v2, and the third threshold value v3 which are stored.

(I) Case where the Touch Movement Speed v is Less than the First Threshold Value v1

In this case, the region setting unit 111c generates a reaction region by using an initial region, which is defined by the read initial region information, with no reduction. Specifically, the region setting unit 111c writes an initial region identifier, position, and size included in the read initial region information into the reaction region table 140 as reaction region information including a reaction region identifier, position, and size. In the case where a plurality of pieces of initial region information are read, the region setting unit 111c generates a plurality of pieces of reaction region information one-to-one corresponding to the read pieces of initial region information. Next, the region setting unit 111c writes the generated reaction region information into the reaction region table 140.

Figure 4:
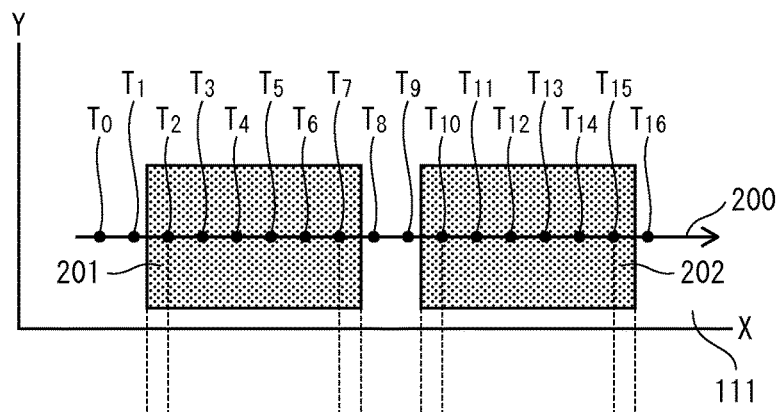
FIG. 4 shows: in section (a) an example of a reaction region of the touch panel 111 that are generated in the case where a touch movement speed v is less than a first threshold value v1; in section (b) an example of a relationship between variation of the touch movement speed v over time and each of threshold values; in section (c) an example of variation of vibration with variation of touch positions; and in section (d) an example of variation of vibration over time.
Figure 4:
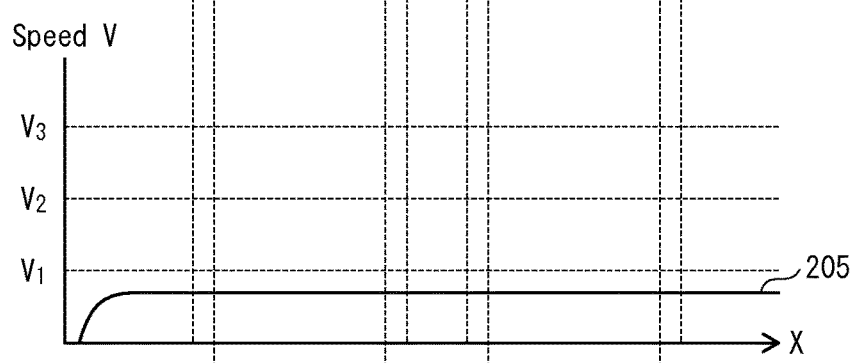
Figure 4:
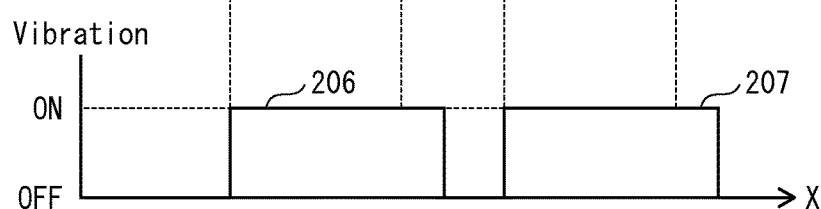
Figure 4:
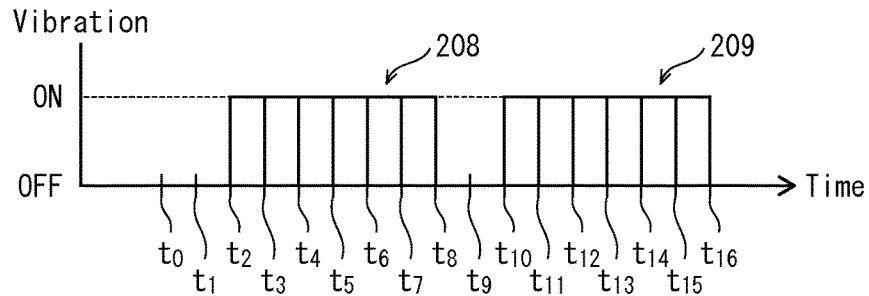

The following describes this case with use of specific examples shown in sections (a) and (b) in FIG. 4.

FIG. 4 shows, in section (a), part of the display screen of the touch panel 111. In the figure, the horizontal axis and the vertical axis are respectively coincident with the X-axis direction and the Y-axis direction in the display screen of the touch panel 111. FIG. 4 shows, in section (a), initial regions 201 and 202 that are respectively defined by first initial region information and second initial region information that are read from the initial region table 130. The initial regions 201 and 202 are each rectangular. Also, FIG. 4 shows, in section (a), touch positions $T_0$, $T_1$, . . . , $T_{16}$ that are respectively detected at time $t_0$, $t_1$, . . . , $t_{16}$. The touch positions $T_0$, $T_1$, . . . , $T_{16}$ form a track 200 of the operation body. The track 200 intersects with the initial regions 201 and 202 as shown in section (a) in FIG. 4.

Also, FIG. 4 shows, in section (b), an example of a relationship between variation of the touch movement speed v over time and each of the first threshold value v1, the second threshold value v2, and the third threshold value v3. In the figure, the horizontal axis is coincident with the X-axis direction in the display screen of the touch panel 111, and the vertical axis represents the touch movement speed of the operation body. Note that the horizontal axis in section (b) in FIG. 4 is coincident with the horizontal axis in section (a) in FIG. 4. Also, FIG. 4 shows, in section (b), variation 205 of the touch movement speed v over time. As shown in the figure, except for at a time immediately after the operation body starts moving, the touch movement speed v is kept to a constant value, and is always less than the first threshold value v1.

Therefore, in this case, the region setting unit 111c generates respective reaction regions by using the initial regions 201 and 202, which are defined by the read pieces of initial region information, with no reduction.

(II) Case where the Touch Movement Speed v is Equal to or Greater than the First Threshold Value v1 and is Less than the Second Threshold Value v2

In this case, the region setting unit 111c generates a reaction region by reducing an initial region, which is defined by read initial region information, anteriorly and posteriorly by ⅓ in the touch movement direction of the operation body. Specifically, the region setting unit 111c calculates position and size of the reaction region resulting from reducing the initial region by ⅓ based on position and size of the initial region included in the read initial region information. Next, the region setting unit 111c writes an initial region identifier included in the read initial region information and the calculated position and size of the reaction region into the reaction region table 140 as reaction region information including a reaction region identifier, position, and size.

Specifically, the region setting unit 111c generates a reaction region as follows.

Figure 5:
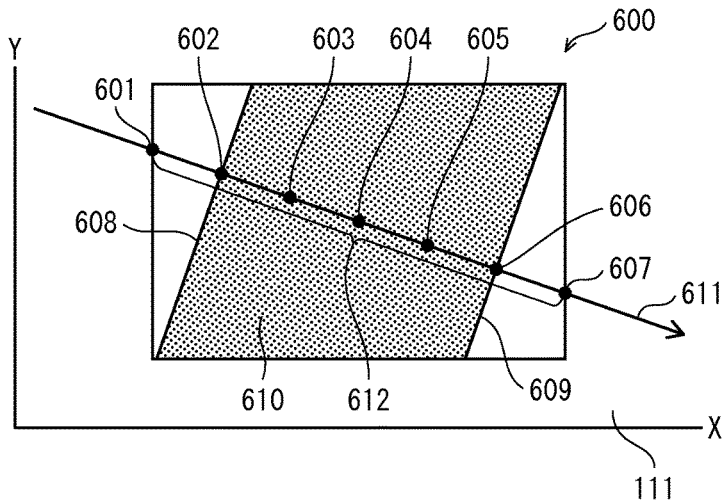
FIG. 5 shows: in section (a) an example of a reaction region that is generated by reducing an initial region anteriorly and posteriorly by ⅓ in a touch movement direction of an operation body; in section (b) an example of a reaction region that is generated by reducing an initial region anteriorly and posteriorly by ⅔ in the touch movement direction of the operation body; and in section (c) an example of a reaction region that is generated as a line segment by reducing an initial region anteriorly and posteriorly in the touch movement direction of the operation body.
Figure 5:
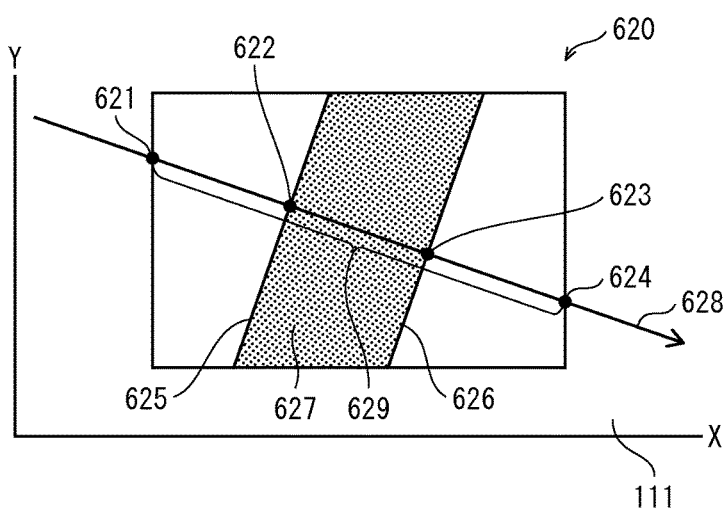
Figure 5:
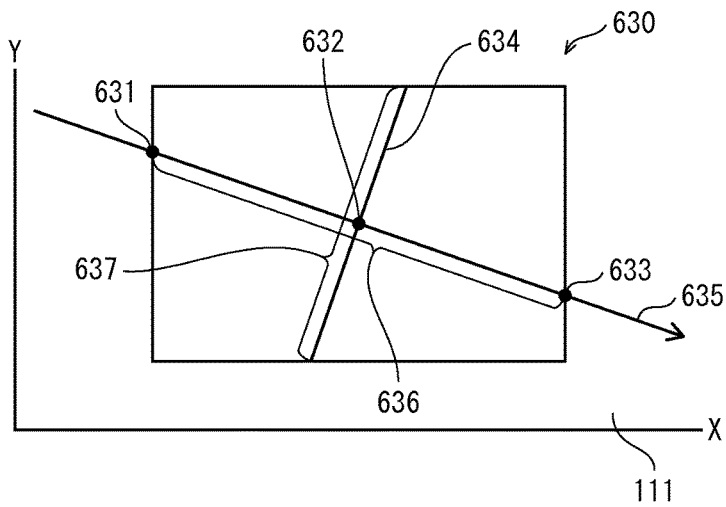

FIG. 5 shows, in section (a), an example of a reaction region 610 that is generated by reducing an initial region 600 anteriorly and posteriorly by ⅓ in the touch movement direction of the operation body. In the figure, the horizontal axis and the vertical axis are respectively coincident with the X-axis direction and the Y-axis direction in the display screen of the touch panel 111.

As shown in section (a) in FIG. 5, the region setting unit 111c virtually calculates, as a track 612, part of a track 611 of touch positions touched by the operation body that is positioned inside the initial region 600. Next, the region setting unit 111c divides the track 612 into six equal parts. As a result, the following points on the track 612 are calculated: an intersection point 601; a first point 602; a second point 603; a third point 604; a fourth point 605; a fifth point 606; and an intersection point 607. The following distances are equal to each other: a distance between the intersection point 601 and the first point 602; a distance between the first point 602 and the second point 603; a distance between the second point 603 and the third point 604; a distance between the third point 604 and the fourth point 605; a distance between the fourth point 605 and the fifth point 606; and a distance between the fifth point 606 and the intersection point 607.

Next, the region setting unit 111c virtually calculates a first perpendicular line 608 that passes through the first point 602 and is perpendicular to the track 612. Also, the region setting unit 111c virtually calculates a second perpendicular line 609 that passes through the fifth point 606 and is perpendicular to the track 612. Then, the region setting unit 111c calculates, as a reaction region 610, a region inside the initial region 600 that is surrounded by the first perpendicular line 608 and the second perpendicular line 609.

In this way, the region setting unit 111c inwardly reduces the initial region 600 anteriorly and posteriorly by ⅓ in the touch movement direction of the operation body which is indicated by the track 611, and thereby to generate the reaction region 610.

Figure 6:
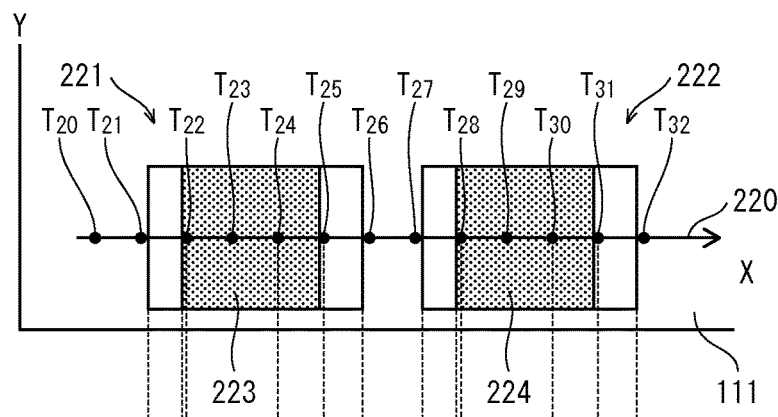
FIG. 6 shows: in section (a) an example of reaction regions of the touch panel 111 that are generated in the case where the touch movement speed v is equal to or greater than the first threshold value v1 and is less than a second threshold value v2; in section (b) an example of a relationship between variation of the touch movement speed v over time and each of the threshold values; in section (c) an example of variation of vibration with variation of touch positions; and in section (d) an example of variation of vibration over time.
Figure 6:
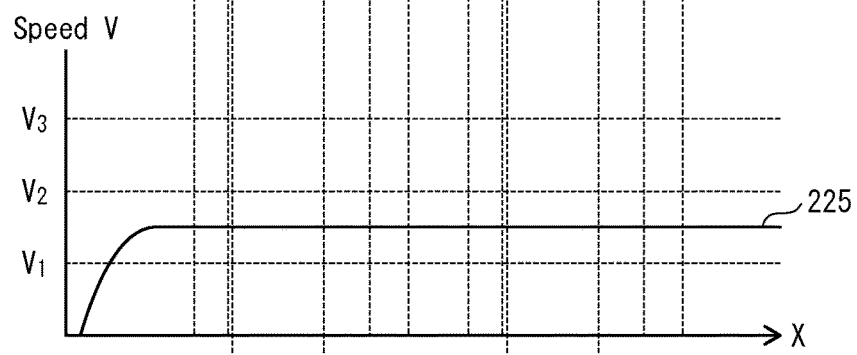
Figure 6:
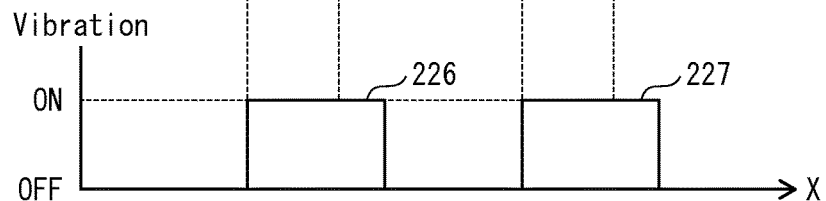
Figure 6:
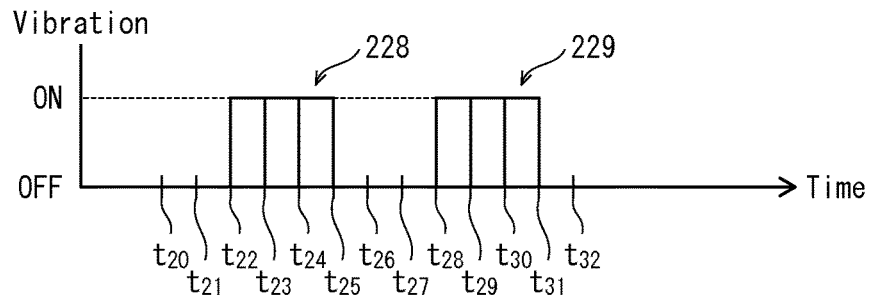

The following describes this case with use of specific examples shown in sections (a) and (b) in FIG. 6.

FIG. 6 shows, in section (a), part of the display screen of the touch panel 111. In the figure, the horizontal axis and the vertical axis are respectively coincident with the X-axis direction and the Y-axis direction in the display screen of the touch panel 111.

FIG. 6 shows, in section (a), initial regions 221 and 222 that are respectively defined by first initial region information and second initial region information that are read from the initial region table 130. The initial regions 221 and 222 are each rectangular. Also, FIG. 6 shows, in section (a), touch positions $T_{20}$, $T_{21}$, . . . , $T_{32}$ that are respectively detected at time $t_{20}$, $t_{21}$, . . . , $t_{32}$. The touch positions $T_{20}$, $T_{21}$, . . . , $T_{32}$ form a track 220 of the operation body. The track 220 intersects with the initial regions 221 and 222 as shown in section (a) in FIG. 6.

Also, FIG. 6 shows, in section (b), an example of a relationship between variation of the touch movement speed v over time and each of the first threshold value v1, the second threshold value v2, and the third threshold value v3. In the figure, the horizontal axis is coincident with the X-axis direction in the display screen of the touch panel 111, and the vertical axis represents the touch movement speed of the operation body. Note that the horizontal axis in section (b) in FIG. 6 is coincident with the horizontal axis in section (a) in FIG. 6. Also, FIG. 6 shows, in section (b), variation 225 of the touch movement speed v over time. As shown in the figure, except for at a time immediately after the operation body starts moving, the touch movement speed v is kept to a constant value, and is always greater than the first threshold value v1 and less than the second threshold value v2.

In this case, the region setting unit 111c reduces the initial region 221, which is defined by the read first initial region information, anteriorly and posteriorly by ⅓ in the touch movement direction, and thereby to generate a rectangular reaction region 223. Also, the region setting unit 111c reduces the initial region 222, which is defined by the read second initial region information, anteriorly and posteriorly by ⅓ in the touch movement direction, and thereby to generate a rectangular reaction region 224.

13

(III) Case where the Touch Movement Speed v is Equal to or Greater than the Second Threshold Value v2 and is Less than the Third Threshold Value v3

In this case, the region setting unit 111c reduces an initial region, which is defined by read initial region information, anteriorly and posteriorly by ⅔ in the touch movement direction of the operation body, and thereby to generate a reaction region. Specifically, the region setting unit 111c calculates position and size of the reaction region resulting from reducing the initial region by ⅔ based on position and size of the initial region included in the read initial region information. Next, the region setting unit 111c writes an initial region identifier included in the read initial region information and the calculated position and size of the reaction region into the reaction region table 140 as reaction region information including a reaction region identifier, position, and size.

Specifically, the region setting unit 111c generates a reaction region as follows.

FIG. 5 shows, in section (b), an example of a reaction region 627 that is generated by reducing an initial region 620 anteriorly and posteriorly by ⅔ in the touch movement direction of the operation body. In the figure, the horizontal axis and the vertical axis are respectively coincident with the X-axis direction and the Y-axis direction in the display screen of the touch panel 111.

As shown in section (b) in FIG. 5, the region setting unit 111c virtually calculates, as a track 629, part of a track 628 of touch positions touched by the operation body that is positioned inside the initial region 620. Next, the region setting unit 111c divides the track 629 into three equal parts. As a result, the following points on the track 629 are calculated: an intersection point 621; a first point 622; a second point 623; and an intersection point 624. The following distances are equal to each other: a distance between the intersection point 621 and the first point 622; a distance between the first point 622 and the second point 623; and a distance between the second point 623 and the intersection point 624.

Next, the region setting unit 111c virtually calculates a first perpendicular line 625 that passes through the first point 622 and is perpendicular to the track 629. Also, the region setting unit 111c virtually calculates a second perpendicular line 626 that passes through the second point 623 and is perpendicular to the track 629. Then, the region setting unit 111c calculates, as a reaction region 627, a region inside the initial region 620 that is surrounded by the first perpendicular line 625 and the second perpendicular line 626.

In this way, the region setting unit 111c reduces the initial region 620 anteriorly and posteriorly by ⅔ in the touch movement direction of the operation body which is indicated by the track 628, and thereby to generate the reaction region 627.

Figure 7:
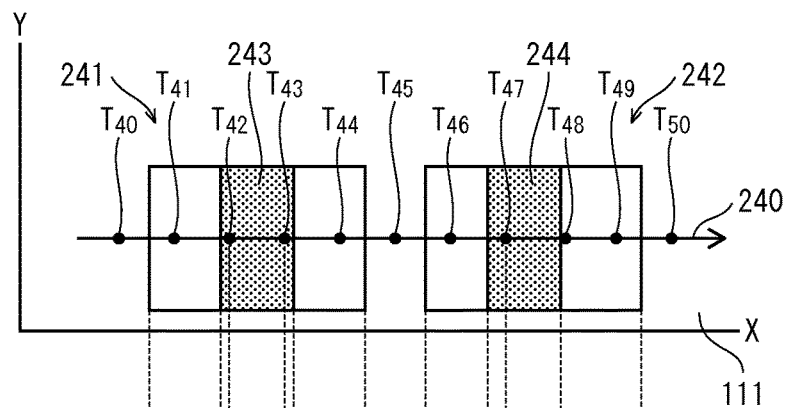
FIG. 7 shows: in section (a) an example of reaction regions of the touch panel 111 that are generated in the case where the touch movement speed v is equal to or greater than the second threshold value v2 and is less than a third threshold value v3; in section (b) an example of a relationship between variation of the touch movement speed v over time and each of the threshold values; in section (c) an example of variation of vibration with variation of touch positions; and in section (d) an example of variation of vibration over time.
Figure 7:
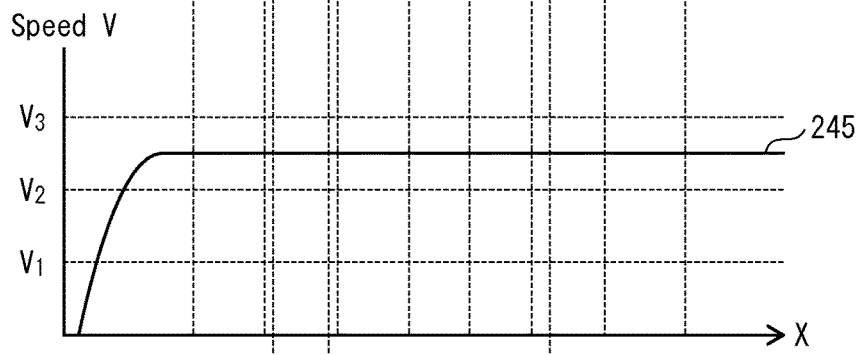
Figure 7:
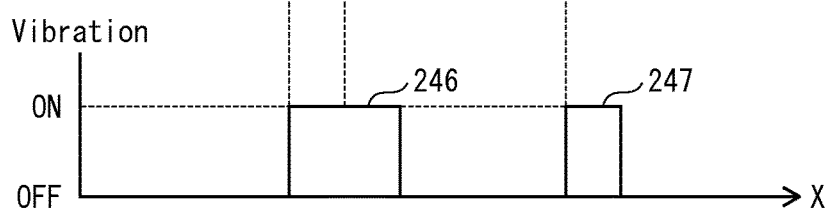
Figure 7:
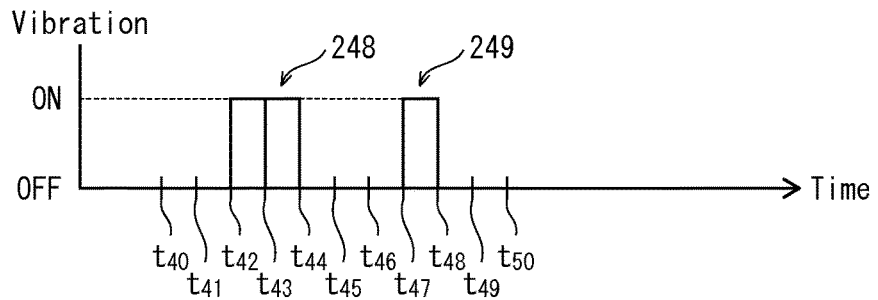

The following describes this case with use of specific examples shown in sections (a) and (b) in FIG. 7.

FIG. 7 shows, in section (a), part of the display screen of the touch panel 111. In the figure, the horizontal axis and the vertical axis are respectively coincident with the X-axis direction and the Y-axis direction in the display screen of the touch panel 111.

FIG. 7 shows, in section (a), initial regions 241 and 242 that are respectively defined by first initial region information and second initial region information that are read from the initial region table 130. The initial regions 241 and 242 are each rectangular. Also, FIG. 7 shows, in section (a), touch positions $T_{40}, T_{41}, \ldots, T_{50}$ that are respectively detected at time $t_{40}, t_{41}, \ldots, t_{50}$. The touch positions $T_{40}$,

14

$T_{41}, \ldots, T_{50}$ form a track 240 of the operation body. The track 240 intersects with the initial regions 241 and 242 as shown in section (a) in FIG. 7.

Also, FIG. 7 shows, in section (b), an example of a relationship between variation of the touch movement speed v over time and each of the first threshold value v1, the second threshold value v2, and the third threshold value v3. In the figure, the horizontal axis is coincident with the X-axis direction in the display screen of the touch panel 111, and the vertical axis represents the touch movement speed of the operation body. Note that the horizontal axis in section (b) in FIG. 7 is coincident with the horizontal axis in section (a) in FIG. 7. Also, FIG. 7 shows, in section (b), variation 245 of the touch movement speed v over time. As shown in the figure, except for at a time immediately after the operation body starts moving, the touch movement speed v is kept to a constant value, and is always greater than the second threshold value v2 and less than the third threshold value v3.

In this case, the region setting unit 111c reduces the initial region 241, which is defined by the read first initial region information, anteriorly and posteriorly by ⅔ in the touch movement direction, and thereby to generate a rectangular reaction region 243. Also, the region setting unit 111c reduces the initial region 242, which is defined by the read second initial region information, anteriorly and posteriorly by ⅔ in the touch movement direction, and thereby to generate a rectangular reaction region 244.

(IV) Case where the Touch Movement Speed v is Equal to or Greater than the Third Threshold Value v3

In this case, the region setting unit 111c reduces an initial region, which is defined by read initial region information, anteriorly and posteriorly in the touch movement direction of the operation body, and thereby to generate a reaction region that is a line segment. Specifically, the region setting unit 111c calculates position and size of the reaction region that is a line segment based on position and size of the initial region included in the read initial region information. Next, the region setting unit 111c writes an initial region identifier included in the read initial region information and the calculated position and size of the reaction region into the reaction region table 140 as reaction region information including a reaction region identifier, position, and size.

Specifically, the region setting unit 111c generates a reaction region as follows.

FIG. 5 shows, in section (c), an example of a reaction region 637 that is generated by reducing an initial region 630 anteriorly and posteriorly in the touch movement direction of the operation body. The reaction region 637 is a line segment. In the figure, the horizontal axis and the vertical axis are respectively coincident with the X-axis direction and the Y-axis direction in the display screen of the touch panel 111.

As shown in section (c) in FIG. 5, the region setting unit 111c virtually calculates, as a track 636, part of a track 635 of touch positions touched by the operation body that is positioned inside the initial region 630. Next, the region setting unit 111c divides the track 636 into two equal parts. As a result, the following points on the track 636 are calculated: an intersection point 631; a middle point 632; and an intersection point 633. The following distances are equal to each other: a distance between the intersection point 631 and the middle point 632; and a distance between the middle point 632 and the intersection point 633.

Next, the region setting unit 111c virtually calculates a perpendicular line 634 that passes through the middle point 632 and is perpendicular to the track 636. Then, the region setting unit 111c calculates, as a reaction region 637, part of the initial region 630 that is coincident with the perpendicular line 634. The reaction region 637 here is a line segment.

In this way, the region setting unit 111c reduces the initial region 630 anteriorly and posteriorly in the touch movement direction of the operation body which is indicated by the track 635, and thereby to generate a line segment as the reaction region 637.

Figure 8:
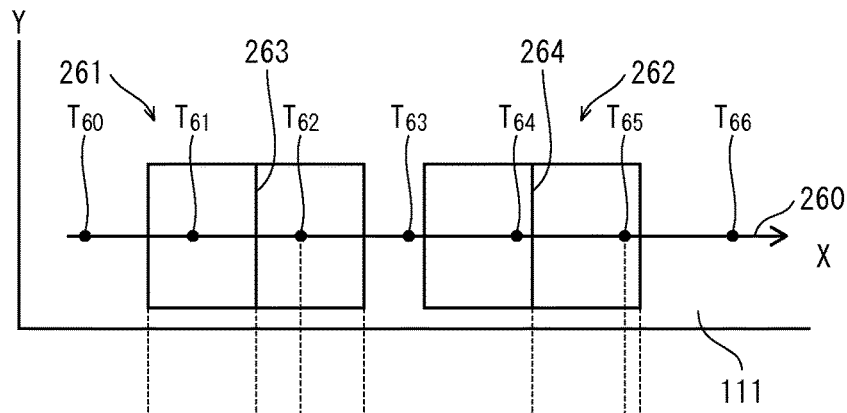
FIG. 8 shows: in section (a) an example of reaction regions of the touch panel 111 that are generated in the case where the touch movement speed v is equal to or greater than the third threshold value v3; in section (b) an example of a relationship between variation of the touch movement speed v over time and each of the threshold values; in section (c) an example of variation of vibration with variation of touch positions; and in section (d) an example of variation of vibration over time.
Figure 8:
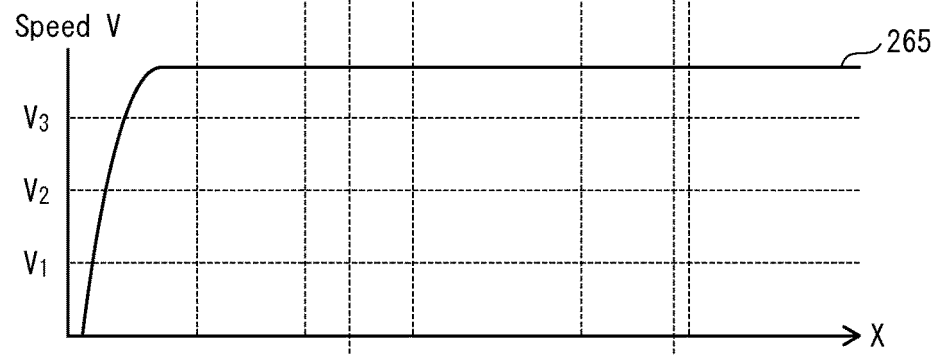
Figure 8:
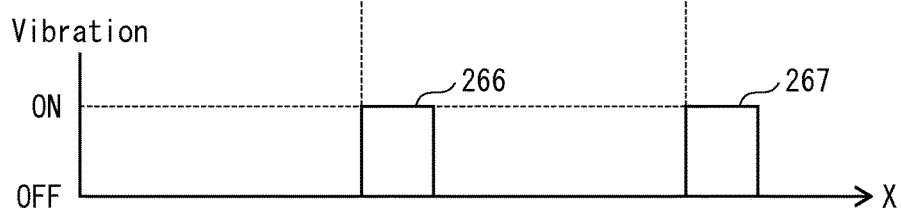
Figure 8:
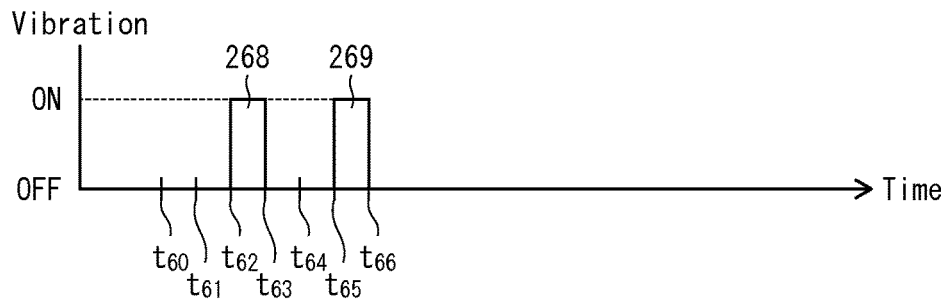

The following describes this case with use of specific examples shown in sections (a) and (b) in FIG. 8.

FIG. 8 shows, in section (a), part of the display screen of the touch panel 111. In the figure, the horizontal axis and the vertical axis are respectively coincident with the X-axis direction and the Y-axis direction in the display screen of the touch panel 111.

FIG. 8 shows, in section (a), initial regions 261 and 262 that are respectively defined by first initial region information and second initial region information that are read from the initial region table 130. The initial regions 261 and 262 are each rectangular. Also, FIG. 8 shows, in section (a), touch positions $T_{60}$, $T_{61}$, . . . , $T_{66}$ that are respectively detected at time $t_{60}$, $t_{61}$, . . . , $t_{66}$. The touch positions $T_{60}$, $T_{61}$, . . . , $T_{66}$ form a track 260 of the operation body. The track 260 intersects with the initial regions 261 and 262 as shown in section (a) in FIG. 8.

Also, FIG. 8 shows, in section (b), an example of a relationship between variation of the touch movement speed v over time and each of the first threshold value v1, the second threshold value v2, and the third threshold value v3. In the figure, the horizontal axis is coincident with the X-axis direction in the display screen of the touch panel 111, and the vertical axis represents the touch movement speed of the operation body. Note that the horizontal axis in section (b) in FIG. 8 is coincident with the horizontal axis in section (a) in FIG. 8. Also, FIG. 8 shows, in section (b), variation 265 of the touch movement speed v over time. As shown in section (b) in FIG. 8, except for at a time immediately after the operation body starts moving, the touch movement speed v is kept to a constant value, and is always greater than the third threshold value v3.

In this case, the region setting unit 111c reduces the initial regions 261 and 262, which are respectively defined by the read first initial region information and second initial region information, anteriorly and posteriorly in the touch movement direction, and thereby to generate rectangular reaction regions 263 and 264 that are each a line segment.

(f) Next, the region setting unit 111c reads all pieces of reaction region information from the reaction region table 140, and outputs respective positions and sizes of reaction regions included in all the read pieces of reaction region information to the vibration control unit 111e.

(2-5) Vibration Control Unit 111e

The vibration control unit 111e judges whether the operation body is positioned inside the set reaction region (the first reaction region or the second reaction region) with use of a touch position detected at a second time point after the reaction region is set. When the operation body is positioned inside the set reaction region, the vibration control unit 111e controls the vibrator 111f to vibrate. When the operation body is not positioned inside the set reaction region, the vibration control unit 111e controls the vibrator 111f not to vibrate.

The vibration control unit 111e receives position and size of the generated reaction region from the region setting unit 111c. Also, the vibration control unit 111e receives position information from the touch pad unit 111a.

Next, the vibration control unit 111e judges whether the reaction region is rectangular, polygonal, or the like, or a line segment based on the received size of the reaction region.

Note that when the touch movement speed v is less than the third threshold value v3, the reaction region is rectangular, polygonal, or the like, as described in the items (2-4)(e)(I) to (III). On the other hand, when the touch movement speed v is equal to or greater than the third threshold value v3, the reaction region is a line segment, as described in the item (2-4)(e)(IV).

In the case where the reaction region is rectangular, polygonal, or the like, upon receiving position information, the vibration control unit 111e judges whether a touch position indicated by the position information is positioned inside the reaction region that is indicated by the received position and size. In other words, the vibration control unit 111e judges whether the operation body is positioned inside the reaction region. When judging that the touch position indicated by the position information is positioned inside the reaction region indicated by the received position and size, the vibration control unit 111e for example controls the vibrator 111f to vibrate for 50 m seconds. In other words, when judging that the operation body is positioned inside the reaction region, the vibration control unit 111e controls the vibrator 111f to vibrate. On the other hand, when judging that the touch position indicated by the position information is not positioned inside the reaction region indicated by the received position and size, the vibration control unit 111e performs no control on the vibrator 111f. In other words, when judging that the operation body is not positioned inside the reaction region, the vibration control unit 111e performs no control on the vibrator 111f.

On the other hand, in the case where the reaction region is a line segment, the vibration control unit 111e performs operations as follows. Upon receiving position information, the vibration control unit 111e virtually generates a line segment by virtually connecting a touch position indicated by the received position information and a touch position indicated by position information that has been received immediately before. Next, the vibration control unit 111e judges whether the generated line segment intersects with the reaction region which is indicated by the received position and size. In other words, the vibration control unit 111e judges whether the operation body is positioned inside the reaction region. When judging that the generated line segment intersects with the reaction region, the vibration control unit 111e for example controls the vibrator 111f to vibrate for 50 m seconds. In other words, when judging that the operation body is positioned inside the reaction region, the vibration control unit 111e controls the vibrator 111f to vibrate. On the other hand, when judging that the generated line segment does not intersect with the reaction region, the vibration control unit 111e performs no control on the vibrator 111f. In other words, when judging that the operation body is not positioned inside the reaction region, the vibration control unit 111e performs no control on the vibrator 111f.

(I) With Respect to the Case where the Touch Movement Speed v is Less than the First Threshold Value v1, Description is Given on Vibration Control Performed by the Vibration Control Unit 111e with Use of Specific Examples Shown in Sections (a) to (d) in FIG. 4.

FIG. 4 shows, in section (c), an example of variation of vibration of the vibrator 111f with variation of touch positions touched by the operation body. In the figure, the horizontal axis is coincident with the X-axis direction in the display screen of the touch panel 111, and the vertical axis represents ON and OFF of vibration. Here, ON indicates a state where the vibrator 111f is vibrating, and OFF indicates a state where the vibrator 111f is not vibrating. Note that the horizontal axis in section (c) in FIG. 4 is coincident with the horizontal axis in sections (a) and (b) in FIG. 4.

The touch position $T_0$ shown in section (a) in FIG. 4 is not positioned inside any of the reaction regions. Accordingly, when the operation body touches the touch position $T_0$ on the touch panel 111, the vibration control unit 111e controls the vibrator 111f not to vibrate. Similarly, when the operation body touches the touch position $T_1$, the vibration control unit 111e controls the vibrator 111f not to vibrate, too.

The touch position $T_2$ shown in section (a) in FIG. 4 is positioned inside the reaction region 201. Accordingly, when the operation body touches the touch position $T_2$, the vibration control unit 111e controls the vibrator 111f to start vibrating. The vibrator 111f continues to vibrate for 50 m seconds. The touch positions $T_3, T_4, \ldots, T_7$ are also each positioned inside the reaction region 201. Accordingly, when the operation body touches each of the touch positions $T_3, T_4, \ldots, T_7$, the vibration control unit 111e controls the vibrator 111f to start vibrating similarly. In this way, the vibrator 111f vibrates for a vibration duration 206 as shown in section (c) in FIG. 4. The vibration duration 206 starts when the operation body touches the touch position $T_2$, and ends when vibration occurring in response to touch made to the touch position $T_7$ by the operation body ends.

The touch positions $T_8$ and $T_9$ shown in section (a) in FIG. 4 are each not positioned inside any of the reaction regions. Accordingly, when the operation body touches each of the touch positions $T_8$ and $T_9$, the vibration control unit 111e controls the vibrator 111f not to vibrate.

Furthermore, the touch positions $T_{10}, T_{11}, T_{12}, \ldots, T_{15}$ shown in section (a) in FIG. 4 are each positioned inside the reaction region 202. Accordingly, when the operation body touches each of the touch positions $T_{10}, T_{11}, T_{12}, \ldots, T_{15}$, the vibration control unit 111e controls the vibrator 111f to start vibrating. In this way, the vibrator 111f vibrates for a vibration duration 207 as shown in section (c) in FIG. 4. The vibration duration 207 starts when the operation body touches the touch position $T_{10}$, and ends when vibration occurring in response to touch made to the touch position $T_{15}$ by the operation body ends.

The touch position $T_{16}$ shown in section (a) in FIG. 4 is not positioned inside any of the reaction regions. Accordingly, when the operation body touches the touch position $T_{16}$, the vibration control unit 111e controls the vibrator 111f not to vibrate.

FIG. 4 shows, in section (d), an example of variation of vibration of the vibrator 111f over time. In the figure, the horizontal axis represents time lapse, and the vertical axis represents ON and OFF of vibration.

The touch positions $T_0$ and $T_1$ that are respectively detected at the time $t_0$ and $t_1$ are each not positioned inside any of the reaction regions. Accordingly, the vibration control unit 111e controls the vibrator 111f not to vibrate at the time $t_0$ and $t_1$.

The touch positions $T_2, T_3, T_4, \ldots, T_7$ that are respectively detected at the time $t_2, t_3, t_4, \ldots, t_7$ are each positioned inside the reaction region 201. Accordingly, the vibration control unit 111e controls the vibrator 111f to start vibrating at each of the time $t_2, t_3, t_4, \ldots, t_7$. In this way, the vibrator 111f continues to vibrate for a vibration duration 208. The vibration duration 208 starts at the time t2 and ends at the time $t_8$. Here, the time $t_8$ is coincident with a time when the vibration which has started at the time $t_7$ ends.

The touch positions $T_8$ and $T_9$ that are respectively detected at the time $t_8$ and $t_9$ are each not positioned inside any of the reaction regions. Accordingly, the vibration control unit 111e controls the vibrator 111f not to vibrate at each of the time $t_8$ and $t_9$.

Also, the touch positions $T_{10}, T_{11}, T_{12}, \ldots, T_{15}$ that are respectively detected at the time $t_{10}, t_{11}, t_{12}, \ldots, t_{15}$ are each positioned inside the reaction region 202. Accordingly, the vibration control unit 111e controls the vibrator 111f to start vibrating at each of the time $t_{10}, t_{11}, t_{12}, \ldots, t_{15}$. In this way, the vibrator 111f continues to vibrate for a vibration duration 209. The vibration duration 209 starts at the time $t_{10}$ and ends at the time $t_{16}$. Here, the time $t_{16}$ is coincident with a time when the vibration which has started at the time $t_{15}$ ends.

(II) Case where the Touch Movement Speed v is Equal to or Greater than the First Threshold Value v1 and is Less than the Second Threshold Value v2

With respect to this case, description is given on vibration control performed by the vibration control unit 111e with use of specific examples shown in sections (a) to (d) in FIG. 6.

FIG. 6 shows, in section (c), an example of variation of vibration of the vibrator 111f with variation of touch positions touched by the operation body. In the figure, the horizontal axis is coincident with the X-axis direction in the display screen of the touch panel 111, and the vertical axis represents ON and OFF of vibration. Note that the horizontal axis in section (c) in FIG. 6 is coincident with the horizontal axis in sections (a) and (b) in FIG. 6.

Touch positions $T_{20}, T_{21}, T_{25}, T_{26}, T_{27}, T_{31}$, and $T_{32}$ shown in section (a) in FIG. 6 are each not positioned inside any reaction region. Accordingly, when the operation body touches each of the touch positions $T_{20}, T_{21}, T_{25}, T_{26}, T_{27}, T_{31}$, and $T_{32}$, the vibration control unit 111e controls the vibrator 111f not to vibrate.

Touch positions $T_{22}, T_{23}$, and $T_{24}$ shown in section (a) in FIG. 6 are each positioned inside the reaction region 223. Accordingly, when the operation body touches each of the touch positions $T_{22}, T_{23}$, and $T_{24}$, the vibration control unit 111e controls the vibrator 111f to start vibrating. One-time vibration of the vibrator 111f continues for 50 m seconds. In this way, the vibrator 111f continues to vibrate for a vibration duration 226 as shown in section (c) in FIG. 6. The vibration duration 226 starts when the operation body touches the touch position $T_{22}$, and ends when vibration occurring in response to touch made to the touch position $T_{24}$ by the operation body ends.

Also, touch positions $T_{28}, T_{29}$, and $T_{30}$ shown in section (a) in FIG. 6 are each positioned inside the reaction region 224. Accordingly, when the operation body touches each of the touch positions $T_{28}, T_{29}$, and $T_{30}$, the vibration control unit 111e controls the vibrator 111f to start vibrating. In this way, the vibrator 111f continues to vibrate for a vibration duration 227 as shown in section (c) in FIG. 6. The vibration duration 227 starts when the operation body touches the touch position $T_{28}$, and ends when vibration occurring in response to touch made to the touch position $T_{30}$ by the operation body ends.

FIG. 6 shows, in section (d), an example of variation of vibration of the vibrator 111f over time. In the figure, the horizontal axis represents time lapse, and the vertical axis represents ON and OFF of vibration.

The touch positions $T_{22}, T_{23}$, and $T_{24}$ that are respectively detected at time $t_{22}, t_{23}$, and $t_{24}$ are each positioned inside the reaction region 223. Accordingly, the vibration control unit 111e controls the vibrator 111f to start vibrating at each of the time $t_{22}, t_{23}$, and $t_{24}$. In this way, the vibrator 111f continues to vibrate for a vibration duration 228. The vibration duration 228 starts at the time $t_{22}$ and ends at time $t_{25}$. Here, the time $t_{25}$ is coincident with a time when the vibration which has started at the time $t_{24}$ ends.

Also, the touch positions $T_{28}$, $T_{29}$, and $T_{30}$ that are respectively detected at time $t_{28}$, $t_{29}$, and $t_{30}$ are each positioned inside the reaction region 224. Accordingly, the vibration control unit 111e controls the vibrator 111f to start vibrating at each of the time $t_{28}$, $t_{29}$, and $t_{30}$. In this way, the vibrator 111f continues to vibrate for a vibration duration 229. The vibration duration 229 starts at the time $t_{28}$ and ends at time $t_{31}$. Here, time $t_{31}$ is coincident with a time when the vibration which has started at the time $t_{30}$ ends.

(III) Case where the Touch Movement Speed v is Equal to or Greater than the Second Threshold Value v2 and is Less than the Third Threshold Value v3

With respect to this case, description is given on vibration control performed by the vibration control unit 111e with use of specific examples shown in sections (a) to (d) in FIG. 7.

FIG. 7 shows, in section (c), an example of variation of vibration of the vibrator 111f with variation of touch positions touched by the operation body. In the figure, the horizontal axis is coincident with the X-axis direction in the display screen of the touch panel 111, and the vertical axis represents ON and OFF of vibration. Note that the horizontal axis in section (c) in FIG. 7 is coincident with the horizontal axis in sections (a) and (b) in FIG. 7.

Touch positions $T_{40}$, $T_{41}$, $T_{44}$, $T_{45}$, $T_{46}$, $T_{48}$, $T_{49}$, and $T_{50}$ shown in section (a) in FIG. 7 are each not positioned inside any reaction region. Accordingly, when the operation body touches each of the touch positions $T_{40}$, $T_{41}$, $T_{44}$, $T_{45}$, $T_{46}$, $T_{48}$, $T_{49}$, and $T_{50}$, the vibration control unit 111e controls the vibrator 111f not to vibrate.

Touch positions $T_{42}$ and $T_{43}$ shown in section (a) in FIG. 7 are each positioned inside the reaction region 243. Accordingly, when the operation body touches each of the touch positions $T_{42}$ and $T_{43}$, the vibration control unit 111e controls the vibrator 111f to start vibrating. The vibrator 111f continues to vibrate for 50 m seconds. In this way, the vibrator 111f continues to vibrate for a vibration duration 246 as shown in section (c) in FIG. 7. The vibration duration 246 starts when the operation body touches the touch position $T_{42}$, and ends when vibration occurring in response to touch made to the touch position $T_{43}$ by the operation body ends.

Also, a touch position $T_{47}$ shown in section (a) in FIG. 7 is inside the reaction region 244. Accordingly, when the operation body touches the touch position $T_{47}$, the vibration control unit 111e controls the vibrator 111f to start vibrating. In this way, the vibrator 111f continues to vibrate for a vibration duration 247 as shown in section (c) in FIG. 7. The vibration duration 247 starts when the operation body touches the touch position $T_{47}$, and ends when vibration occurring in response to touch made to the touch position $T_{47}$ by the operation body ends.

FIG. 7 shows, in section (d), an example of variation of vibration of the vibrator 111f over time. In the figure, the horizontal axis represents time lapse, and the vertical axis represents ON and OFF of vibration.

The touch positions $T_{42}$ and $T_{43}$ that are respectively detected at time $t_{42}$ and $t_{43}$ are each positioned inside the reaction region 243. Accordingly, the vibration control unit 111e controls the vibrator 111f to start vibrating at each of the time $t_{42}$ and $t_{43}$. In this way, the vibrator 111f continues to vibrate for a vibration duration 248. The vibration duration 248 starts at the time $t_{42}$ and ends at time $t_{44}$. Here, time $t_{44}$ is coincident with a time when the vibration which has started at the time $t_{43}$ ends.

Also, a touch position $T_{47}$ that is detected at time $t_{47}$ is positioned inside the reaction region 244. Accordingly, the vibration control unit 111e controls the vibrator 111f to start vibrating at the time $t_{47}$. In this way, the vibrator 111f continues to vibrate for a vibration duration 249. The vibration duration 249 starts at the time $t_{47}$ and ends at time $t_{48}$. Here, the time $t_{48}$ is coincident with a time when the vibration which has started at the time $t_{47}$ ends.

(IV) Case where the Touch Movement Speed v is Equal to or Greater than the Third Threshold Value v3

With respect to this case, description is given on vibration control performed by the vibration control unit 111e with use of specific examples shown in sections (a) to (d) in FIG. 8.

FIG. 8 shows, in section (c), an example of variation of vibration of the vibrator 111f with variation of touch positions touched by the operation body. In the figure, the horizontal axis is coincident with the X-axis direction in the display screen of the touch panel 111, and the vertical axis represents ON and OFF of vibration. Note that the horizontal axis in section (c) in FIG. 8 is coincident with the horizontal axis in sections (a) and (b) in FIG. 8.

As shown in section (a) in FIG. 8, the reaction regions 263 and 264 are each a line segment.

The vibration control unit 111e receives position information at time $t_{61}$. Next, the vibration control unit 111e virtually connects a touch position $T_{61}$ indicated by the received position information and a touch position $T_{60}$ indicated by position information which has been received at an immediately previous time $t_{60}$, and thereby to virtually generate a line segment $T_{60}$-$T_{61}$. Next, the vibration control unit 111e judges whether the generated line segment $T_{60}$-$T_{61}$ intersects with any reaction region. Since the generated line segment $T_{60}$-$T_{61}$ does not intersect with any reaction region, the vibration control unit 111e 111f performs no control on the vibrator 111f. In other words, the vibration control unit 111e 111f controls the vibrator 111f not to vibrate.

The vibration control unit 111e receives position information at time $t_{62}$. Next, the vibration control unit 111e virtually connects a touch position $T_{62}$ indicated by the received position information and the touch position $T_{61}$ indicated by the position information which has been received at the immediately previous time $t_{61}$, and thereby to virtually generate a line segment $T_{61}$-$T_{62}$. Next, the vibration control unit 111e judges whether the generated line segment $T_{61}$-$T_{62}$ intersects with any reaction region. Since the generated line segment $T_{61}$-$T_{62}$ intersects with the reaction region 263, the vibration control unit 111e for example controls the vibrator 111f to vibrate for 50 m seconds.

As described above, in the case where the generated line segments $T_{61}$-$T_{62}$ intersects any reaction region, the operation body is regarded to be positioned inside the reaction region.

In this way, the vibrator 111f vibrates for a vibration duration 266 as shown in section (c) in FIG. 8. The vibration duration 266 starts when the operation body touches the touch position $T_{62}$, and ends when vibration occurring in response to touch made to the touch position $T_{62}$ by the operation body ends.

Also, the vibration control unit 111e receives position information at each of time $t_{63}$ and $t_{64}$. In this case, the vibration control unit 111e performs operations in the same manner as in the case where the position information is received at the time $t_{61}$.

Furthermore, the vibration control unit 111e receives position information at time $t_{65}$. Next, the vibration control unit 111e virtually connects a touch position $T_{65}$ indicated by the received position information and a touch position $T_{64}$ indicated by the position information which has been received at the immediately previous time $t_{64}$, and thereby to virtually generate a line segment $T_{64}$-$T_{65}$. Next, the vibration control unit 111e judges whether the generated line segment $T_{64}$-$T_{65}$ intersects with any reaction region. Since the generated line segment $T_{64}$-$T_{65}$ intersects with the reaction region 264, the vibration control unit 111e for example controls the vibrator 111f to vibrate for 50 m seconds.

In this way, the vibrator 111f vibrates for a vibration duration 267 as shown in section (c) in FIG. 8. The vibration duration 267 starts when the operation body touches the touch position $T_{65}$, and ends when vibration occurring in response to touch made to the touch position $T_{65}$ by the operation body ends.

Also, FIG. 8 shows, in section (d), an example of variation of vibration of the vibrator 111f over time. In the figure, the horizontal axis represents time lapse, and the vertical axis represents ON and OFF of vibration.

As shown in the figure, the vibration control unit 111e controls the vibrator 111f to start vibrating at time $t_{62}$. The vibrator 111f continues to vibrate for 50 m seconds. In this way, the vibrator 111f continues to vibrate for a vibration duration 268. The vibration duration 268 starts at the time $t_{62}$ and ends at time $t_{63}$. Here, the time $t_{63}$ is coincident with a time when the vibration which has started at the time $t_{62}$ ends.

Also, the vibration control unit 111e controls the vibrator 111f to start vibrating at time $t_{65}$. The vibrator 111f continues to vibrate for 50 m seconds. In this way, the vibrator 111f continues to vibrate for a vibration duration 269. The vibration duration 269 starts at the time $t_{65}$ and ends at time $t_{66}$. Here, the time $t_{66}$ is coincident with a time when the vibration which has started at the time $t_{65}$ ends.

(2-6) Vibrator 111f

The vibrator 111f is for example composed of a motor having a gravity-biased weight attached to a shaft thereof. Also, the vibrator 111f is provided on the reverse surface of the display panel unit 111b so as to be in touch with the display panel unit 111b. The vibrator 111f vibrates and stops vibrating under control by the vibration control unit 111e. Note that the vibrator 111f may be made of a piezoelectric element.

(3) Button Operation Reception Unit 112

The button operation reception unit 112 includes buttons 112a, 112b, 112c, 112d, 112e, and 112f. These buttons are each operated by being pressed by the user for receiving an operation.

The button 112a is for example a button used for displaying an icon menu that is optionally provided. Also, the button 112b is for example a button used for displaying a desktop screen. Furthermore, the button 112d is for example a button used for turning the power ON and OFF.

When each of the buttons is operated, the button operation reception unit 112 outputs, an input signal, an operation signal indicating an operation corresponding to the button to the main control unit 108 via the input/output control unit 109.

(4) Input/Output Control Unit 109

The input/output control unit 109 relays input and output of information between the touch panel 111 and the main control unit 108. Also, the input/output control unit 109 receives an input signal from the button operation reception unit 112, and outputs the received input signal to the main control unit 108. Furthermore, the input/output control unit 109 controls lighting and flashing of the power lamp 113.

Moreover, the input/output control unit 109 receives one initial region table from the main control unit 108, and outputs the received initial region table to the region setting unit 111c.

(5) Main Control Unit 108

The main control unit 108 receives an input signal from each of the touch pad unit 111a of the touch panel 111 and the button operation reception unit 112 via the input/output control unit 109. Then, the main control unit 108 performs processing corresponding to the received input signal.

Also, the main control unit 108 outputs one or more images and position data indicating a display position of each of the images to the display panel unit 111b of the touch panel 111 via the input/output control unit 109.

Furthermore, the main control unit 108 reads one initial region table corresponding to an icon menu that is to be displayed next from the storage unit 110, and outputs the read initial region table to the input/output control unit 109.

Moreover, the main control unit 108 controls the compositional elements of the mobile terminal device 100.

(6) Antenna 101, Communication Circuit 102, and Communication Control Unit 106

The antenna 101 wirelessly transmits and receives a wireless signal to and from a base station which is not illustrated. The communication circuit 102 performs selection and conversion of frequency of a wireless signal which is transmitted and received to and from the antenna 101. The communication control unit 106 relays transmission and reception of information between the communication circuit 102 and the main control unit 108.

(7) Audio Processing Unit 103, Speaker 104, Microphone 105, Audio Control Unit 107, and Power Lamp 113

The audio processing unit 103 demodulates an audio signal received by the communication circuit 102, and outputs the demodulated audio signal as a sound signal to the speaker 104. Also, the audio processing unit 103 modulates an audio signal that has been converted to an electrical signal in response to a sound signal input from the microphone 105, and controls the communication circuit 102 to transmit the modulated audio signal. The speaker 104 outputs sound such as audio. The microphone 105 inputs sound such as audio. The audio control unit 107 controls audio processing performed by the audio processing unit 103. The power lamp 113 lights or flashes under control by the input/output control unit 109.

1.2 Operations of Mobile Terminal Device 100

Figure 9:
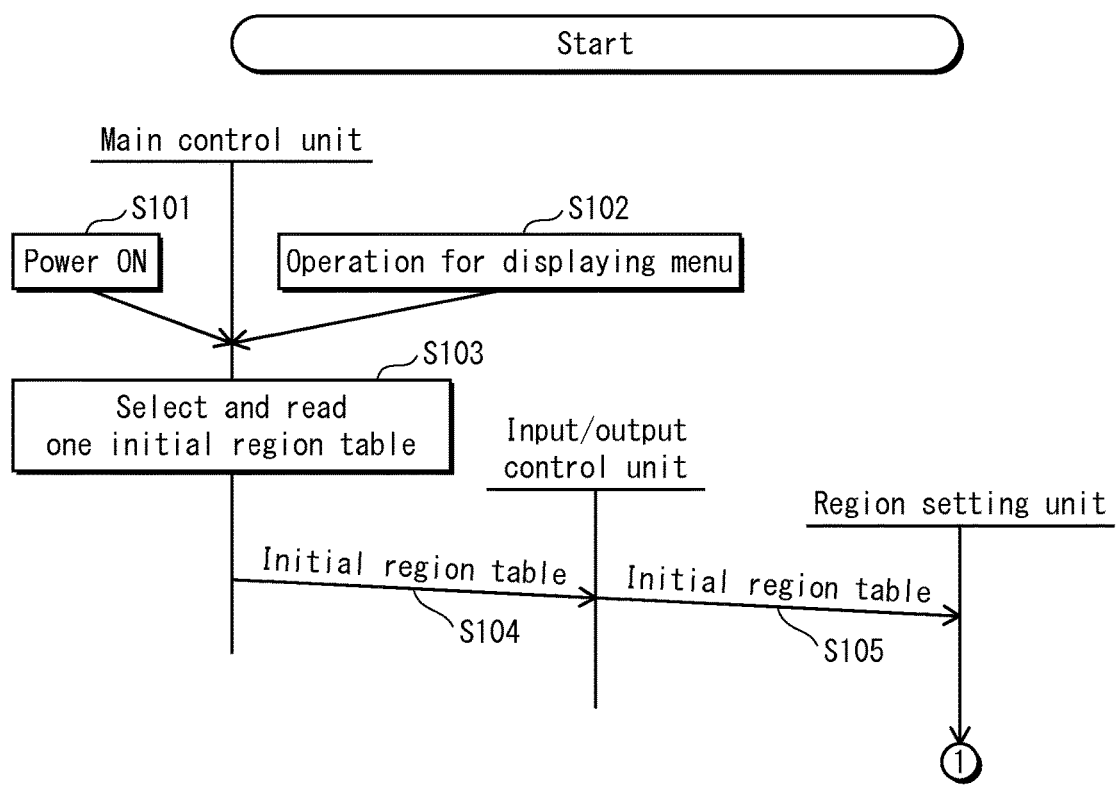
FIG. 9 is a first sequence diagram showing operations of the mobile terminal device 100, continuing to FIG. 10.
Figure 10:
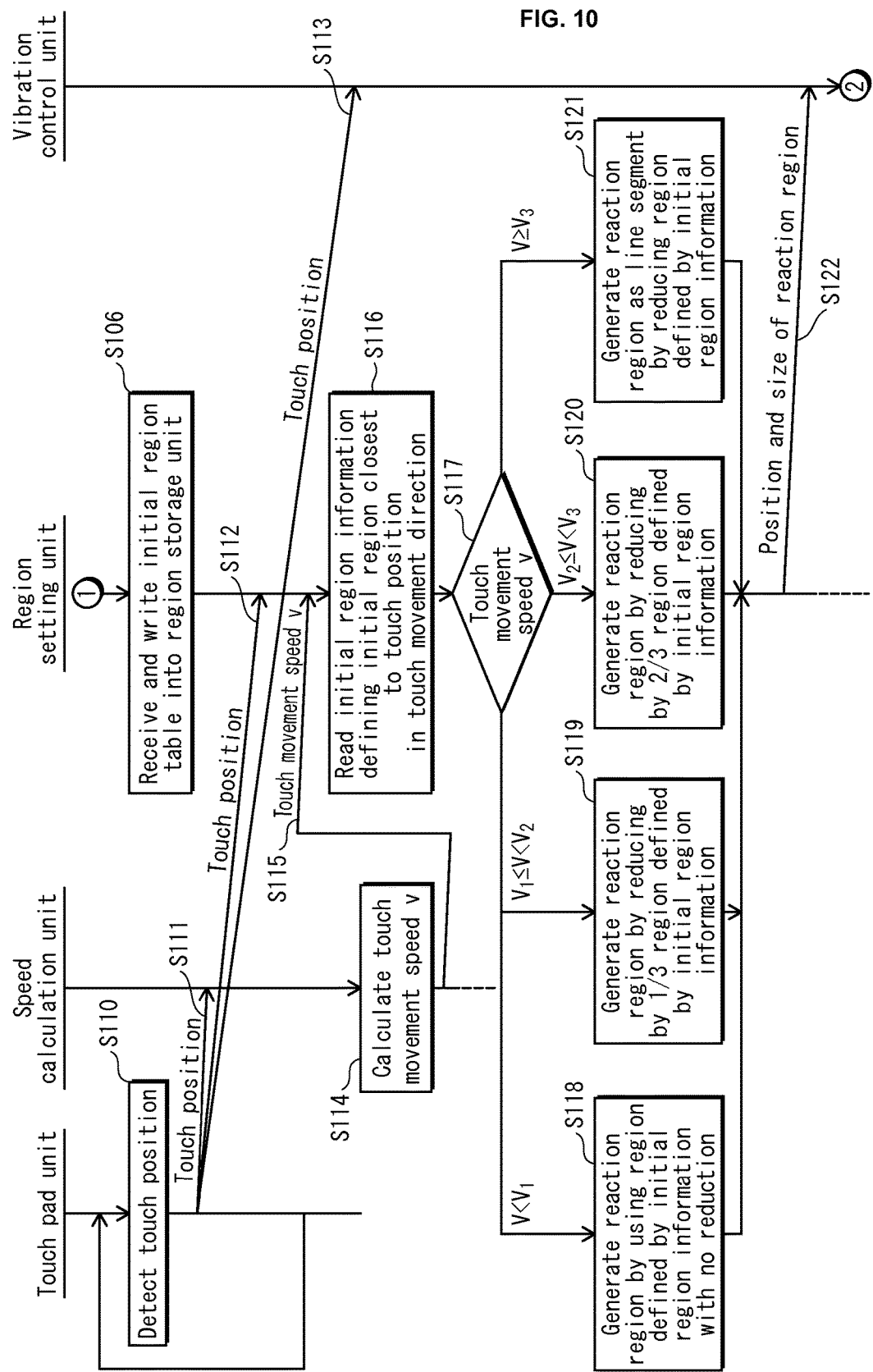
FIG. 10 is a second sequence diagram showing the operations of the mobile terminal device 100, continuing to FIG. 11.
Figure 11:
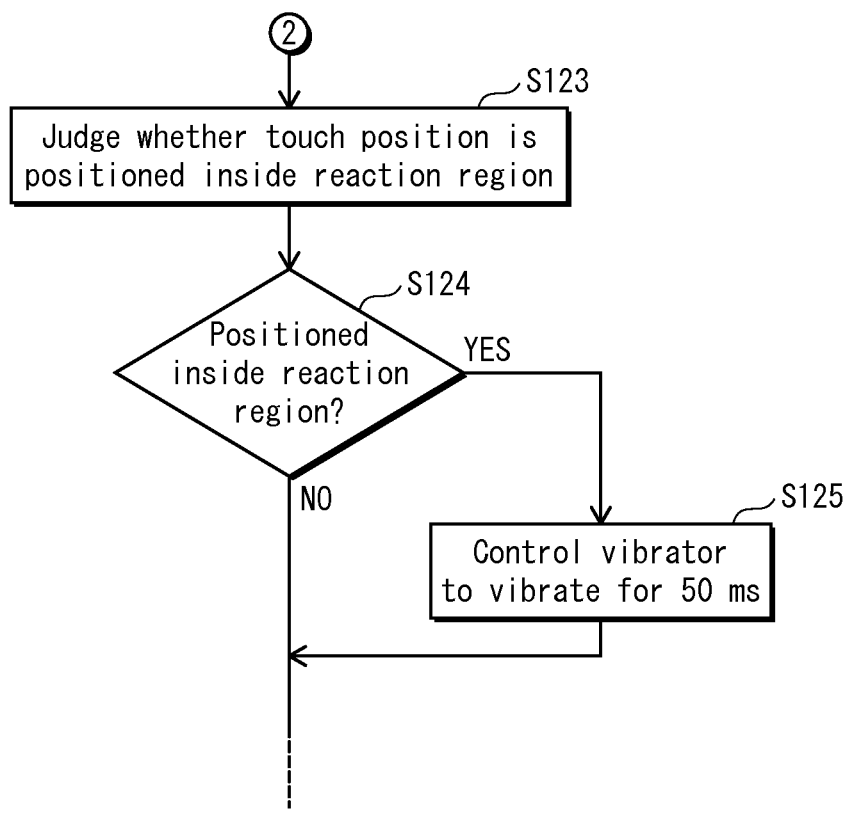
FIG. 11 is a third sequence diagram showing the operations of the mobile terminal device 100, continuing from FIG. 10.

The following describes the operations of the mobile terminal device 100 with reference to sequence diagrams shown in FIG. 9 to FIG. 11.

An operation is performed for turning the power ON by the user pressing the button 112d. Next, the button operation reception unit 112 outputs an input signal to the main control unit 108 via the input/output control unit 109. The input signal indicates that the operation for turning the power ON has been performed. The input signal also indicates that an icon menu that is displayed first after the power ON is to be displayed (Step S101). Alternatively, an operation is performed for displaying an icon menu which is optionally provided, by the user pressing the button 112a. Next, the button operation reception unit 112 outputs an input signal to the main control unit 108 via the input/output control unit 109. The input signal indicates that the operation for displaying the icon menu which is optionally provided has been performed. The input signal also indicates that the icon menu which is optionally provided is to be displayed (Step S102).

Next, upon receiving the input signal, the main control unit 108 selects one initial region table corresponding to the icon menu which is indicated by the received input signal to be displayed, from among the initial region tables 120a, 120b, 120c, . . . which are stored in the storage unit 110. Then, the main control unit 108 reads the selected initial region table (Step S103), and outputs the read initial region table to the input/output control unit 109 (Step S104). Upon receiving the initial region table, the input/output control unit 109 outputs the received initial region table to the region setting unit 111c (Step S105).

Upon receiving the initial region table, the region setting unit 111c writes the received initial region table as an initial region table 130 into the region storage unit 111g (Step S106).

When the operation body touches the touch pad unit 111a, the touch pad unit 111a detects a touch position touched by the operation body at 50 m second intervals. Each time the touch pad unit 111a detects a touch position, the touch pad unit 111a generates position information indicating the touch position (Step S110). Next, the touch pad unit 111a outputs the generated position information to the speed calculation unit 111d, the region setting unit 111c, and the vibration control unit 111e (Steps S111, S112, and S113). Then, the touch pad unit 111a returns to Step S110 and repeatedly detects a touch position.

The speed calculation unit 111d calculates a touch movement speed v (Step S114), and outputs the calculated touch movement speed v to the region setting unit 111c (Step S115).

The region setting unit 111c reads, from the initial region table 130, initial region information defining an initial region that is positioned anterior to the touch position in the touch movement direction and closest to the touch position. In other words, the region setting unit 111c reads, from the initial region table 130, initial region information defining an initial region that is positioned closest to the touch position among initial regions that intersect with a predicted track of touch positions (Step S116).

Next, the region setting unit 111c compares the received touch movement speed v with each of the first threshold value v1, the second threshold value v2, and the third threshold value v3 which are stored (Step S117).

When the touch movement speed v is less than the first threshold value v1 (Step S117: v<v1), the region setting unit 111c generates a reaction region by using the initial region, which is defined by the read initial region information, with no reduction (Step S118).

When the touch movement speed v is equal to or greater than the first threshold value v1 and is less than the second threshold value v2 (Step S117: v1≤v<v2), the region setting unit 111c reduces the initial region, which is defined by the read initial region information, anteriorly and posteriorly by ⅓ in the touch movement direction of the operation body, and thereby to generate a reaction region (Step S119).

When the touch movement speed v is equal to or greater than the second threshold value v2 and is less than the third threshold value v3 (Step S117: v2≤v<v3), the region setting unit 111c reduces the initial region, which is defined by the read initial region information, anteriorly and posteriorly by ⅔ in the touch movement direction, and thereby to generate a reaction region (Step S120).

When the touch movement speed v is equal to or greater than the third threshold value v3 (Step S117: v≥v3), the region setting unit 111c reduces the initial region, which is defined by the read initial region information, anteriorly and posteriorly in the touch movement direction, and thereby to generate a line segment as a reaction region (Step S121).

Next, the region setting unit 111c outputs position and size of the reaction region to the vibration control unit 111e (Step S122).

The vibration control unit 111e judges whether a touch position is positioned inside the reaction region (Step S123). When the touch position is positioned inside the reaction region (Step S124: YES), the vibration control unit 111e controls the vibrator 111f to vibrate for 50 m seconds (Step S125). When the touch position is not positioned inside the reaction region (Step S124: NO), the vibration control unit 111e performs no control on the vibrator 111f. In other words, the vibration control unit 111e controls the vibrator 111f not to vibrate.

1.3 Summary

The touch panel 111 as an input device of the mobile terminal device 100 solves a problem that further fast movement of the operation body makes it difficult to distinguish between a plurality of vibrations.

The touch panel 111 as an input device vibrates to inform a user of that the operation body touches a region on the operation screen, the region being for receiving an operation instruction allocated to the region. The touch panel 111 includes: the touchpad unit 111a that repeatedly detects a touch position on the operation screen touched by the operation body while the operation body is in touch with the operation screen; the speed calculation unit 111d that calculates the touch movement speed at each detected touch position, the touch movement speed indicating a speed at which the operation body moves on the operation screen while being in touch with the operation screen; the vibrator 111f; the region setting unit 111c that compares the touch movement speed at a touch position detected at a first time point with a threshold value, (i) when the touch movement speed is less than the threshold value, sets a first reaction region on the operation screen so as to be positioned anterior to the detected touch position in a touch movement direction of the operation body, and (ii) when the touch movement speed is equal to or greater than the threshold value, sets a second reaction region on the operation screen so as to be positioned anterior to the detected touch position in the touch movement direction, the second reaction region being smaller than the first reaction region; and the vibration control unit 111e that judges whether the operation body is positioned inside the set reaction region, with use of a touch position detected at a second time point after the reaction region is set, when the operation body is positioned inside the set reaction region, controls the vibrator to vibrate, and when the operation body is not positioned inside the set reaction region, controls the vibrator not to vibrate.

According to this configuration, when the touch movement speed of the operation body at a touch position is equal to or greater than the threshold value, the second reaction region, which is smaller than the first reaction region, is generated so as to be positioned anterior to the touch position in the movement direction of the operation body. Also, when the operation body is positioned inside the second reaction region after the second reaction region is set, the vibrator vibrates. Accordingly, it is possible to provide a temporal interval between a start time point of vibration occurring in response to touch to the second reaction region and an end time point of an immediately previous vibration thereof. This allows the user to distinguish between the vibration occurring in response to touch to the second reaction region and the immediately previous vibration.

Note that a specific example of the threshold value may be the first threshold value v1 which is described above. In this case, a specific example of the first reaction region is the reaction regions 201 and 202 shown in section (a) in FIG. 4. Also, a specific example of the second reaction region is the reaction regions 223 and 224 shown in section (a) in FIG. 6, the reaction regions 243 and 244 shown in section (a) in FIG. 7, or the reaction regions 263 and 264 shown in section (a) in FIG. 8.

Alternatively, a specific example of the threshold value may be the second threshold value v2 which is described above. In this case, a specific example of the first reaction region is the reaction regions 201 and 202 shown in section (a) in FIG. 4 or the reaction regions 223 and 224 shown in section (a) in FIG. 6. Also, a specific example of the second reaction region is the reaction regions 243 and 244 shown in section (a) in FIG. 7 or the reaction regions 263 and 264 shown in section (a) in FIG. 8.

Further alternatively, a specific example of the threshold value may be the third threshold value v3 which is described above. In this case, a specific example of the first reaction region is the reaction regions 201 and 202 shown in section (a) in FIG. 4, the reaction regions 223 and 224 shown in section (a) in FIG. 6, or the reaction regions 243 and 244 shown in section (a) in FIG. 7. Also, a specific example of the second reaction region is the reaction regions 263 and 264 shown in section (a) in FIG. 8.

Also, as described above, when the touch movement speed at the detected touch position is equal to or greater than the threshold value and is less than a sub threshold value, the region setting unit 111c makes a first reduction to the initial region, and sets a region resulting from the first reduction as the second reaction region. On the other hand, when the touch movement speed at the detected touch position is equal to or greater than the threshold value and is equal to or greater than the sub threshold value, the region setting unit 111c makes a second reduction to the initial region, and sets a region resulting from the second reduction as the second reaction region. Here, the sub threshold value is greater than the threshold value, and the second reduction is greater in degree than the first reduction.

Here, a specific example of the threshold value may be the first threshold value v1 which is described above, and a specific example of the sub threshold value may be the second threshold value v2 which is described above. In this case, a specific example of the first reduction is reduction for generating the reaction regions 223 and 224 shown in section (a) in FIG. 6. Also, a specific example of the second reduction is reduction for generating the reaction regions 243 and 244 shown in section (a) in FIG. 7 or reduction for generating the reaction regions 263 and 264 shown in section (a) in FIG. 8.

Alternatively, a specific example of the threshold value may be the second threshold value v2 which is described above, and a specific example of the sub threshold value may be the third threshold value v3 which is described above. In this case, a specific example of the first reduction is reduction for generating the reaction regions 243 and 244 shown in section (a) in FIG. 7. Also, a specific example of the second reduction is reduction for generating the reaction regions 263 and 264 shown in section (a) in FIG. 8.

2. Other Modifications

Although the present invention has been described based on the above embodiment, the present invention is of course not limited to the above embodiment. The present invention also includes the following cases.

(1) According to the above embodiment, the region setting unit 111c generate a reaction region by reducing an initial region anteriorly and posteriorly in the touch movement direction of the operation body, as shown in sections (a), (b), and (c) in FIG. 5. In this case, the initial region is reduced by removing both an end part on the movement destination side and an end part on the movement origination side of the initial region. However, reduction of the initial region is not limited to this.

Alternatively, the reaction region may be generated by reducing the initial region anteriorly, posteriorly, or both anteriorly and posteriorly in the touch movement direction of the operation body.

(a) For example, the region setting unit 111c may generate a reaction region by reducing an initial region posteriorly in the touch movement direction of the operation body, in other words, by reducing the initial region toward the upstream side in the touch movement direction of the operation body, as shown below. Specifically, the initial region may be reduced by removing the end part on the movement destination side of the initial region.

Figure 12:
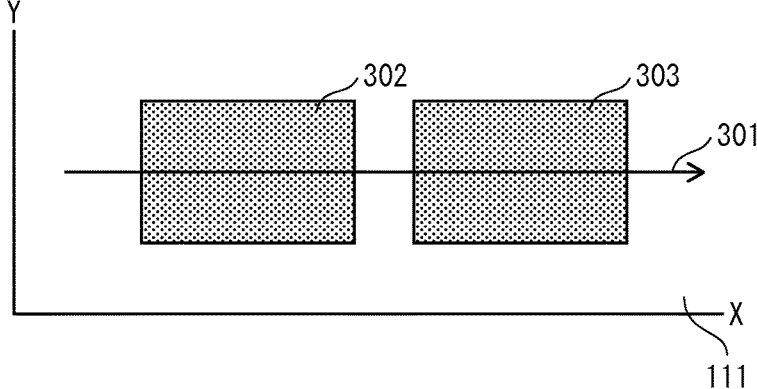
FIG. 12 shows: in section (a) an example of reaction regions that are generated in the case where the touch movement speed v is less than the first threshold value v1; in section (b) an example of reaction regions that are generated by reducing an initial region posteriorly in the touch movement direction of the operation body in the case where the touch movement speed v is equal to or greater than the first threshold value v1 and is less than the second threshold value v2; in section (c) an example of reaction regions that are generated by reducing an initial region posteriorly in the touch movement direction of the operation body in the case where the touch movement speed v is equal to or greater than the second threshold value v2 and is less than the third threshold value v3; and in section (d) an example of reaction regions that are generated by reducing an initial region posteriorly in the touch movement direction of the operation body in the case where the touch movement speed v is equal to or greater than the third threshold value v3.
Figure 12:
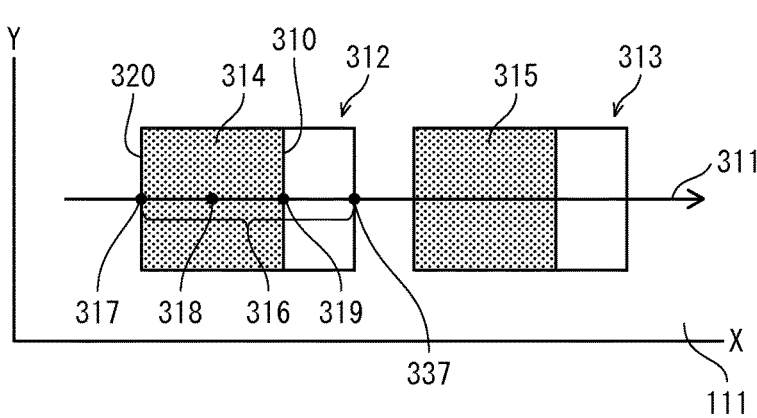
Figure 12:
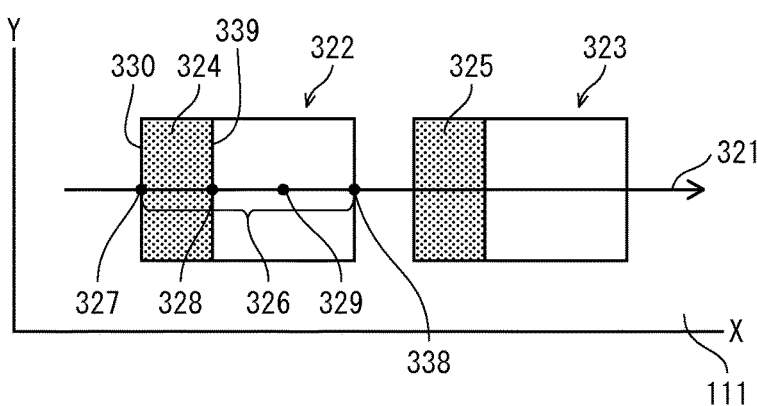
Figure 12:
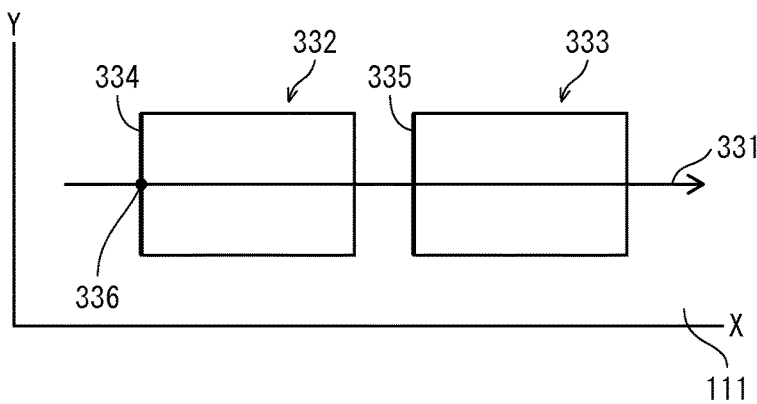

FIG. 12 shows, in sections (a) to (d), part of the display screen of the touch panel 111. In these figures, the horizontal axis and the vertical axis are respectively coincident with the X-axis direction and the Y-axis direction in the display screen of the touch panel 111.

(I) FIG. 12 shows, in section (a), reaction regions 302 and 303 that are generated in the case where the touch movement speed v is less than the first threshold value v1.

As shown in the figure, the region setting unit 111c generates the reaction regions 302 and 303 respectively by using initial regions 302 and 303 with no reduction. A track 301 of the operation body passes through the reaction regions 302 and 303.

(II) FIG. 12 shows, in section (b), reaction regions 314 and 315 that are generated in the case where the touch movement speed v is equal to or greater than the first threshold value v1 and is less than the second threshold value v2.

As shown in section (b) in FIG. 12, the region setting unit 111c virtually calculates, as a track 316, part of a track 311 of touch positions touched by the operation body that is positioned inside the initial region 312. Next, the region setting unit 111c divides the track 316 into three equal parts. As a result, the following points on the track 316 are calculated: an intersection point 317; a first point 318; a second point 319; and an intersection point 337. The following distances are equal to each other: a distance between the intersection point 317 and the first point 318; a distance between the first point 318 and the second point 319; and a distance between the second point 319 and the intersection point 337.

Next, the region setting unit 111c virtually calculates a first perpendicular line 320 that passes through the intersection point 317 and is perpendicular to the track 316. In this case, a side 320 on the movement origination side of the initial region 312 is coincident with the first perpendicular line 320. Also, the region setting unit 111c virtually calculates a second perpendicular line 310 that passes through the second point 319 and is perpendicular to the track 316. Then, the region setting unit 111c calculates, as a reaction region 314, a region inside the initial region 312 that is surrounded by the first perpendicular line 320 and the second perpendicular line 310.

In this way, the region setting unit 111c reduces the initial region 312 posteriorly by ⅓ in the touch movement direction of the operation body which is indicated by the track 311, and thereby to generate the reaction region 314.

Also, in the same manner as in the initial region 312, the region setting unit 111c reduces an initial region 313 posteriorly by ⅓ in the touch movement direction of the operation body which is indicated by the track 311, and thereby to generate a reaction region 315.

(III) FIG. 12 shows, in section (c), reaction regions 324 and 325 that are generated in the case where the touch movement speed v is equal to or greater than the second threshold value v2 and is less than the third threshold value v3.

As shown in section (c) in FIG. 12, the region setting unit 111c virtually calculates, as a track 326, part of a track 321 of touch positions touched by the operation body that is positioned inside the initial region 322. Next, the region setting unit 111c divides the track 326 into three equal parts. As a result, the following points on the track 326 are calculated: an intersection point 327; a first point 328; a second point 329; and an intersection point 338. The following distances are equal to each other: a distance between the intersection point 327 and the first point 328; a distance between the first point 328 and the second point 329; and a distance between the second point 329 and the intersection point 338.

Next, the region setting unit 111c virtually calculates a first perpendicular line 330 that passes through the intersection point 327 and is perpendicular to the track 326. In this case, a side 330 on the movement origination side of the initial region 322 is coincident with the first perpendicular line 330. Also, the region setting unit 111c virtually calculates a second perpendicular line 339 that passes through the first point 328 and is perpendicular to the track 326. Then, the region setting unit 111c calculates, as a reaction region 324, a region inside the initial region 322 that is surrounded by the first perpendicular line 330 and the second perpendicular line 339.

In this way, the region setting unit 111c reduces the initial region 322 posteriorly by ⅔ in the touch movement direction of the operation body which is indicated by the track 321, and thereby to generate the reaction region 324.

Also, in the same manner as in the case of the initial region 322, the region setting unit 111c reduces an initial region 323 posteriorly by ⅔ in the touch movement direction of the operation body which is indicated by the track 321, and thereby to generate a reaction region 325.

(IV) FIG. 12 shows, in section (d), reaction regions 334 and 335 that are generated in the case where the touch movement speed v is equal to or greater than the third threshold value v3.

As shown in section (d) in FIG. 12, the region setting unit 111c virtually calculates, among four sides constituting an initial region 332, a side 334 that intersects with a track 331 of the operation body and is positioned posterior in the touch movement direction which is indicated by the track 331. Next, the region setting unit 111c virtually calculates an intersection point 336 where the side 334 on the movement origination side intersects with the track 331. Next, the region setting unit 111c virtually calculates a perpendicular line 334 that passes through the intersection point 336 and is perpendicular to the track 331. In this case, the side 334 on the movement origination side of the initial region 332 is coincident with the perpendicular line 334. Part of the straight line 334 that is positioned inside the initial region 332 is set as a reaction region 334. The reaction region 334 is formed from a line segment.

Also, in the same manner as in the case of the initial region 322, the region setting unit 111c generates a reaction region 335 from an initial region 333. The reaction region 335 is also formed from a line segment.

(Summary) As described in the above items (II) to (IV), the region setting unit 111c reduces an initial region posteriorly in the touch movement direction of the operation body, and thereby to generate a reaction region. This provides a space between the reaction region and a succeeding reaction region.

Also, when the operation body passes on a reaction region, a start point where vibration starts is coincident with a point on a border line that forms an initial region on which an icon is arranged. This allows the user to identify a border between a region on which the icon is arranged at the same time when the vibration starts.

(b) For example, the region setting unit 111c may generate a reaction region by reducing an initial region anteriorly in the touch movement direction of the operation body, in other words, by reducing the initial region toward the downstream side in the touch movement direction of the operation body, as shown below. Specifically, the initial region may be reduced by removing an end part on the movement origination side of the initial region.

Figure 13:
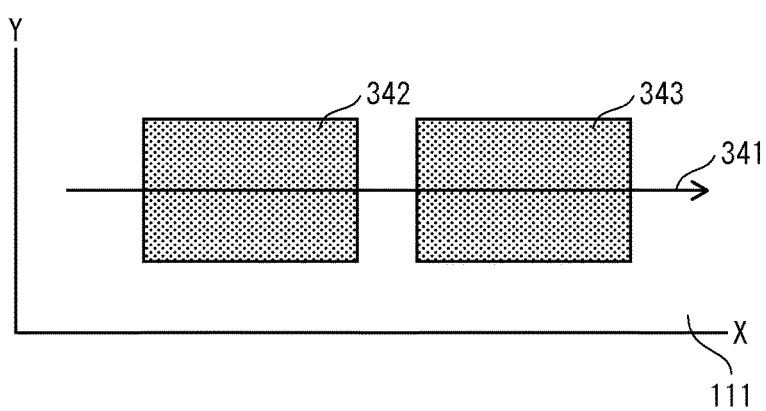
FIG. 13 shows: in section (a) an example of reaction regions that are generated in the case where the touch movement speed v is less than the first threshold value v1; in section (b) an example of reaction regions that are generated by reducing an initial region anteriorly in the touch movement direction of the operation body in the case where the touch movement speed v is equal to or greater than the first threshold value v1 and is less than the second threshold value v2; in section (c) an example of reaction regions that are generated by reducing an initial region anteriorly in the touch movement direction of the operation body in the case where the touch movement speed v is equal to or greater than the second threshold value v2 and is less than the third threshold value v3; and in section (d) an example of reaction regions that are generated by reducing an initial region anteriorly in the touch movement direction of the operation body in the case where the touch movement speed v is equal to or greater than the third threshold value v3.
Figure 13:
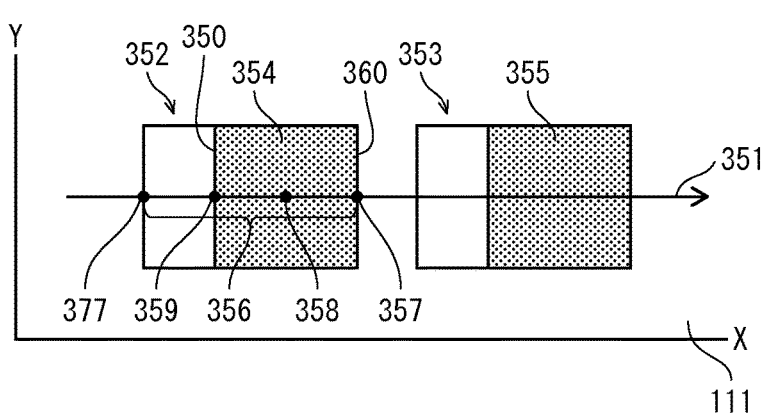
Figure 13:
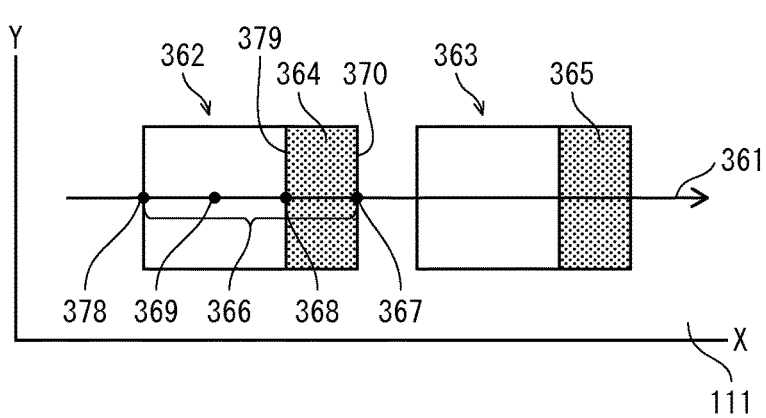
Figure 13:
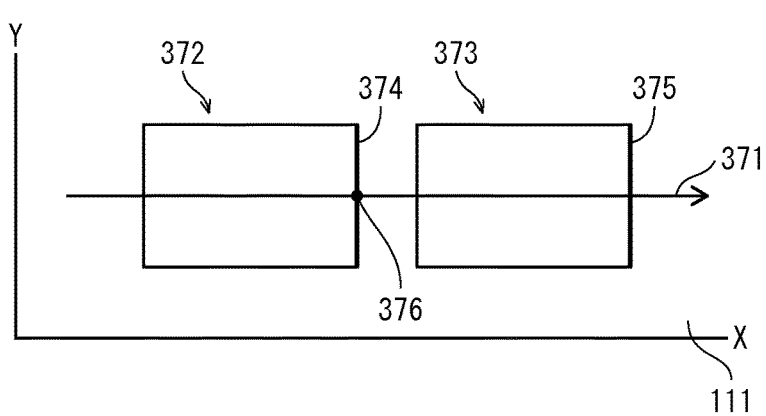

FIG. 13 shows, in sections (a) to (d), part of the display screen of the touch panel 111. In these figures, the horizontal axis and the vertical axis are respectively coincident with the X-axis direction and the Y-axis direction in the display screen of the touch panel 111.

(I) FIG. 13 shows, in section (a), reaction regions 342 and 343 that are generated in the case where the touch movement speed v is less than the first threshold value v1.

As shown in the figure, the region setting unit 111c generates the reaction regions 342 and 343 respectively by using initial regions 342 and 343 without reduction. A track 341 of the operation body passes through the reaction regions 342 and 343.

(II) FIG. 13 shows, in section (b), reaction regions 354 and 355 that are generated in the case where the touch movement speed v is equal to or greater than the first threshold value v1 and is less than the second threshold value v2.

As shown in section (b) in FIG. 13, the region setting unit 111c virtually calculates, as a track 356, part of a track 351 of the operation body that is included in the initial region 352. Next, the region setting unit 111c divides the track 356 into three equal parts. As a result, the following points on the track 356 are calculated: an intersection point 357; a first point 358; and an intersection point 377. The following distances are equal to each other: a distance between the intersection point 357 and the first point 358; a distance between the first point 358 and the second point 359; and a distance between the second point 359 and the intersection point 377.

Next, the region setting unit 111c virtually calculates a first perpendicular line 360 that passes through the intersection point 357 and is perpendicular to the track 356. In this case, a side 360 on the movement destination side of the initial region 352 is coincident with the first perpendicular line 360. Also, the region setting unit 111c virtually calculates a second perpendicular line 350 that passes through the second point 359 and is perpendicular to the track 356. Then, the region setting unit 111c calculates, as a reaction region 354, a region inside the initial region 352 that is surrounded by the first perpendicular line 360 and the second perpendicular line 350.

In this way, the region setting unit 111c reduces the initial region 352 anteriorly by ⅓ in the touch movement direction of the operation body which is indicated by the track 351, and thereby to generate the reaction region 354.

Also, in the same manner as in the case of the initial region 352, the region setting unit 111c reduces an initial region 353 anteriorly by ⅓ in the touch movement direction of the operation body which is indicated by the track 351, and thereby to generate a reaction region 355.

(III) FIG. 13 shows, in section (c), reaction regions 364 and 365 that are generated in the case where the touch movement speed v is equal to or greater than the second threshold value v2 and is less than the third threshold value v3.

As shown in section (c) in FIG. 13, the region setting unit 111c virtually calculates, as a track 366, part of a track 361 of touch positions touched by the operation body that is positioned inside the initial region 362. Next, the region setting unit 111c divides the track 366 into three equal parts. As a result, the following points on the track 366 are calculated: an intersection point 378; a first point 369; a second point 368; and an intersection point 367. The following distances are equal to each other: a distance between the intersection point 378 and the first point 369; a distance between the first point 369 and the second point 368; and a distance between the second point 368 and the intersection point 367.

Next, the region setting unit 111c virtually calculates a first perpendicular line 370 that passes through the intersection point 367 and is perpendicular to the track 366. In this case, a side 370 on the movement destination side of the initial region 362 is coincident with the first perpendicular line 370. Also, the region setting unit 111c virtually calculates a second perpendicular line 379 that passes through the second point 368 and is perpendicular to the track 366. Then, the region setting unit 111c calculates, as a reaction region 364, a region inside the initial region 362 that is surrounded by the first perpendicular line 370 and the second perpendicular line 379.

In this way, the region setting unit 111c reduces the initial region 362 anteriorly by ⅔ in the touch movement direction of the operation body which is indicated by the track 361, and thereby to generate the reaction region 364.

Also, in the same manner as in the initial region 362, the region setting unit 111c reduces an initial region 363 anteriorly by ⅔ in the touch movement direction of the operation body which is indicated by the track 361, and thereby to generate a reaction region 365.

(IV) FIG. 13 shows, in section (d), reaction regions 374 and 375 that are generated in the case where the touch movement speed v is equal to or greater than the third threshold value v3.

As shown in section (d) in FIG. 13, the region setting unit 111c virtually calculates, among four sides constituting the initial region 372, a downstream side 374 that intersects with a track 371 and is positioned anterior in the touch movement direction which is indicated by the track 371. Next, the region setting unit 111c virtually calculates an intersection point 376 where the side 374 on the movement destination side intersects with the track 371. Next, the region setting unit 111c virtually calculates a perpendicular line 374 that passes through the intersection point 376 and is perpendicular to the track 371. In this case, the side 374 on the movement destination side of the initial region 372 is coincident with the perpendicular line 374. Part of the straight line 374 that is positioned inside the initial region 372 is set as a reaction region 374. The reaction region 374 is formed from a line segment.

Also, in the same manner as in the case of the initial region 372, the region setting unit 111c generates a reaction region 375 from an initial region 373. The reaction region 375 is also formed from a line segment.

(Summary) As described in the above items (II) to (IV), the region setting unit 111c generates a reaction region by reducing an initial region anteriorly and posteriorly in the touch movement direction of the operation body. This provides a space between the reaction region and a preceding reaction region.

(2) The following describes a modification of generation of reaction region.

Figure 14:
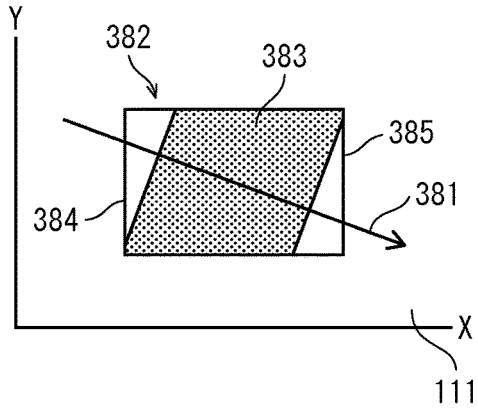
FIG. 14 shows: in section (a) an example of a reaction region that is generated in the case where a track of touched positions touched by the operation body proceeds from one lateral side toward another lateral side facing the one lateral side in an initial region; in section (b) an example of a reaction region that is generated in the case where a track of touch positions touched by the operation body proceeds from an upper side toward a lateral side in an initial region; and in section (c) an example of a reaction region that is generated in the case where a track of touch positions touched by the operation body proceeds from an upper side toward a lower side in an initial region.
Figure 14:
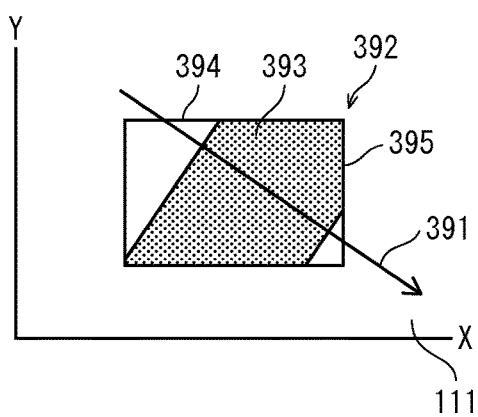
Figure 14:
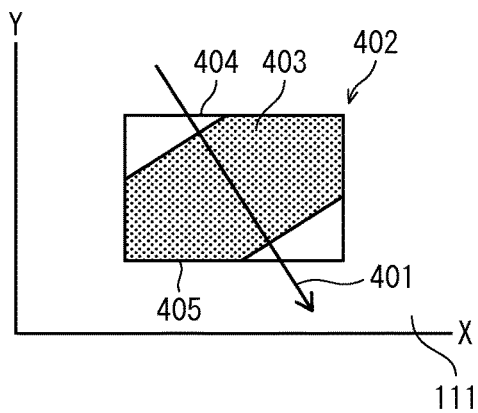

FIG. 14 shows, in sections (a), (b), and (c), examples of part of the display screen of the touch panel 111. In these figures, the horizontal axis and the vertical axis are respectively coincident with the X-axis direction and the Y-axis direction in the display screen of the touch panel 111.

(I) FIG. 14 shows, in section (a), an example of a reaction region that is generated in the case where a track 381 of touch positions touched by the operation body proceeds from a lateral side 384 toward a lateral side 385 facing the lateral side 384 in an initial region 382. In this case, the region setting unit 111c generates a reaction region 383 by reducing the initial region 382 anteriorly and posteriorly in the touch movement direction of the operation body which is indicated by the track 381, as described in the above embodiment.

Note that the region setting unit 111c may generate a reaction region by reducing the initial region 382 anteriorly or posteriorly in the touch movement direction which is indicated by the track 381.

(II) FIG. 14 shows, in section (b), an example of a reaction region that is generated in the case where a track 391 of touch positions touched by the operation body proceeds from an upper side 394 toward a lateral side 395 in an initial region 392. In this case, the region setting unit 111c generates a reaction region 393 by reducing the initial region 392 anteriorly and posteriorly in the touch movement direction of the operation body which is indicated by the track 391, as described in the above embodiment.

Note that the region setting unit 111c may generate a reaction region by reducing the initial region 392 anteriorly or posteriorly in the touch movement direction which is indicated by the track 391.

(III) FIG. 14 shows, in section (c), an example of a reaction region that is generated in the case where a track 401 of touch positions touched by the operation body proceeds from an upper side 404 toward a lower side 405 in an initial region 402. In this case, the region setting unit 111c generates a reaction region 403 by reducing the initial region 402 anteriorly and posteriorly in the touch movement direction of the operation body which is indicated by the track 401, as described in the above embodiment.

Note that the region setting unit 111c may generate the reaction region 403 by reducing the initial region 402 anteriorly or posteriorly in the touch movement direction which is indicated by the track 401.

(Summary) As described in the above sections (I) to (III), even in the case where touch and movement of the operation body is made while the track of touch positions touched by the operation body forms various angles relative to sides constituting an initial region, the region setting unit 111c generates a reaction region by reducing the initial region anteriorly, posteriorly, or both anteriorly and posteriorly in the touch movement direction of the operation body. This provides a space between the reaction region and a reaction region that is adjacent anteriorly or posteriorly in the touch movement direction of the operation body.

(3) The following describes another modification of generation of reaction region.

Figure 15:
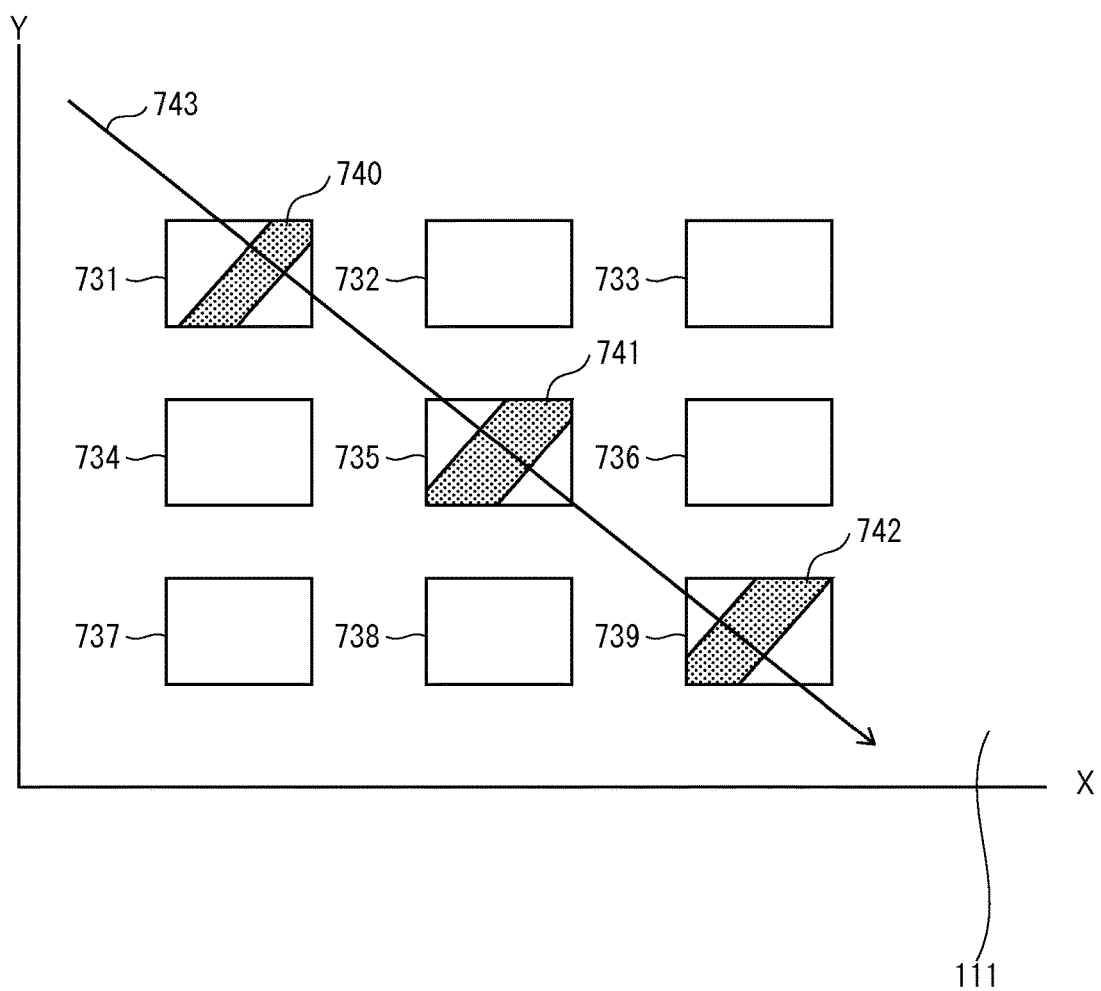
FIG. 15 shows an example of reaction regions that are generated in the case where initial regions are arranged in matrix.

FIG. 15 shows an example of part of the display screen of the touch panel 111. In the figure, the horizontal axis and the vertical axis are respectively coincident with the X-axis direction and the Y-axis direction in the display screen of the touch panel 111. On the display screen in FIG. 15, initial regions 731, 732, . . . , 739 are arranged in matrix. FIG. 15 also shows a track 743 of touch positions touched by the operation body.

The track 743 intersects with the initial regions 731, 735, and 739. The region setting unit 111c generates reaction regions 740, 741, and 742 from the initial regions 731, 735, and 739, respectively.

In this way, even in the case where touch and movement of the operation body are made on the display screen of the touch panel 111 on which a plurality of initial regions are arranged in matrix, the region setting unit 111c may generate a reaction region by reducing an initial region anteriorly, posteriorly, or both anteriorly and posteriorly in the touch movement direction of the operation body such as described above.

This provides a space between the reaction region and a reaction region that is adjacent anteriorly or posteriorly in the touch movement direction of the operation body.

Figure 16:
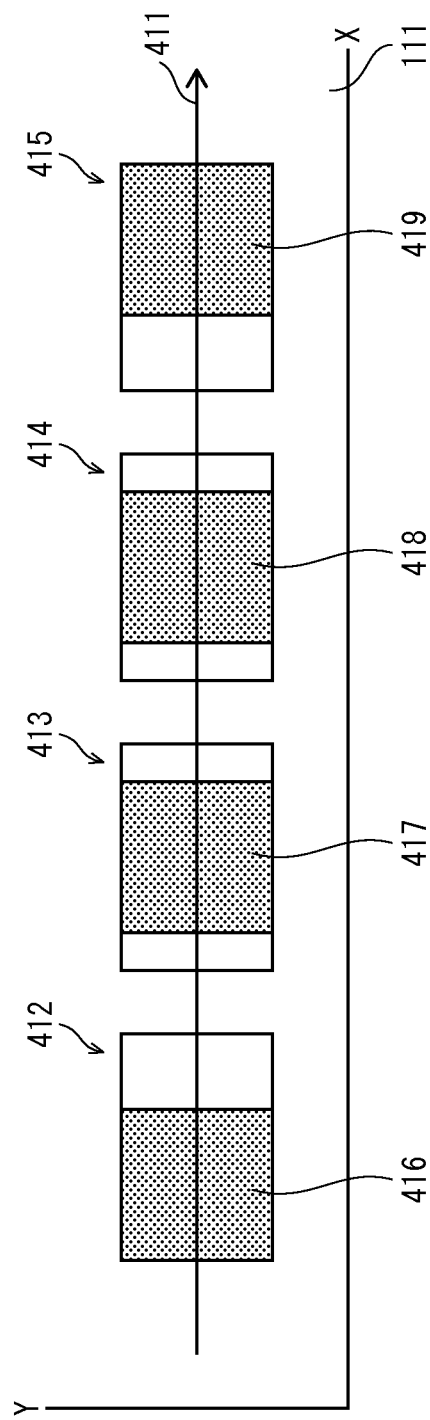
FIG. 16 shows an example of reaction regions that are generated in the case where a track of touch positions touched by the operation body intersects with four initial regions that are arranged in the X-axis direction.

(4) FIG. 16 shows an example of part of the display screen of the touch panel 111. In the figure, the horizontal axis and the vertical axis are respectively coincident with the X-axis direction and the Y-axis direction in the display screen of the touch panel 111.

Suppose a case where four initial regions 412, 413, 414, and 415 are arranged in line in the X-axis direction, as shown in FIG. 16. A track 411 of touch positions touched by the operation body intersects with the four initial regions 412, 413, 414, and 415. Also, the operation body passes on the initial regions 412, 413, 414, and 415 in this order while being in touch with the initial regions 412, 413, 414, and 415, respectively.

In the case where a plurality of initial regions are arranged in this way, the region setting unit 111c may generate a reaction region by reducing an initial region according to a reduction method that changes depending on a positional relationship between the initial regions as follows.

With respect to the initial region 412 that is positioned closest to a movement start position of the operation body, the region setting unit 111c reduces the initial region 412 posteriorly in the touch movement direction of the operation body, and thereby to generate a reaction region 416, in the same manner as in the cases shown in sections (b) to (d) in FIG. 12.

Also, with respect to the initial region 415 that is positioned closest to a movement end position of the operation body, the region setting unit 111c reduces the initial region 415 anteriorly in the touch movement direction of the operation body, and thereby to generate a reaction region 419, in the same manner as in the cases shown in sections (b) to (d) in FIG. 13.

Furthermore, with respect to the initial regions 413 and 414 that are positioned between the initial regions 412 and 415, the region setting unit 111c reduces the initial regions 413 and 414 anteriorly and posteriorly in the touch movement direction of the operation body, respectively, and thereby to generate reaction regions 417 and 418, in the same manner as in the cases shown in sections (a) to (c) in FIG. 5.

The same applies to the case where three initial regions are arranged in the X-axis direction and the case where five or more initial regions are arranged in the X-axis direction. Furthermore, the same applies to the case where three or more initial regions are arranged in the Y-axis direction.

As described above, the region setting unit 111c stores therein first initial region information, second initial region information, and third initial region information that respectively define a first initial region, a second initial region, and a third initial region that are arranged on the operation screen. The first initial region, the second initial region, and the third initial region are arranged on the operation screen in this order from the upstream to the downstream in the touch movement direction.

When the touch movement speed is equal to or greater than the first threshold value, the region setting unit 111c reduces the first initial region, which is defined by the first initial region information, posteriorly in the touch movement direction of the operation body, and sets a region resulting from reduction as a first reaction region. Also, the region setting unit 111c reduces the second initial region, which is defined by the second initial region information, anteriorly and posteriorly in the touch movement direction of the operation body, and sets a region resulting from reduction as a second reaction region. Furthermore, the region setting unit 111c reduces the third initial region, which is defined by the third initial region information, anteriorly in the touch movement direction of the operation body, and sets a region resulting from reduction as a third reaction region.

Here, the region setting unit 111c reduces the first initial region by removing an anterior end part of the first initial region in the touch movement direction of the operation body.

Also, the region setting unit 111c reduces the second initial region by removing a posterior end part of the second initial region in the touch movement direction of the operation body.

Furthermore, the region setting unit 111c reduces the third initial region by removing a posterior end part of the third initial region in the touch movement direction of the operation body.

(Summary) In this way, a reaction region is generated by reducing an initial region according to a reduction method that changes depending on a positional relationship between a plurality of initial regions. This exhibits an advantage that a further large distance is ensured between two reaction regions that are adjacent to each other.

(5) The following describes the case where the touch movement speed v of the operation body exceeds the threshold value while moving on one initial region on the touch panel 111.

Figure 17:
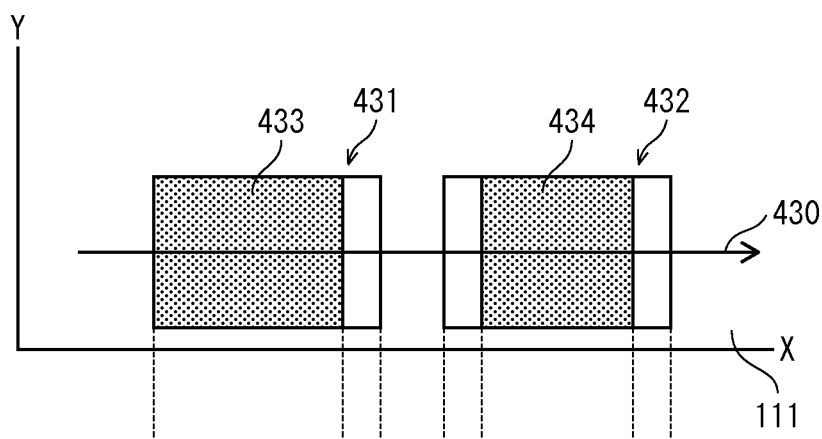
FIG. 17 shows: in section (a) an example of reaction regions of the touch panel 111 that are generated in the case where the touch moving speed v exceeds the threshold value while the operation body moves on one initial region; in section (b) an example of a relationship between variation of the touch movement speed v over time and each of the threshold values; and in section (c) an example of variation of vibration with variation of touch positions.
Figure 17:
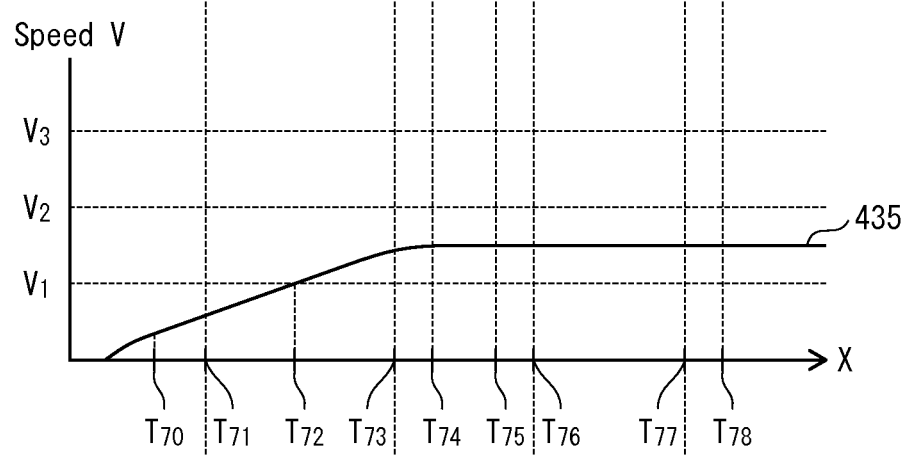
Figure 17:
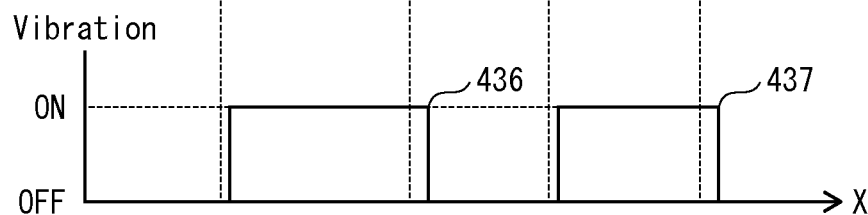

FIG. 17 shows, in section (a), an example of part of the display screen of the touch panel 111. In the figure, the horizontal axis and the vertical axis are respectively coincident with the X-axis direction and the Y-axis direction in the display screen of the touch panel 111.

FIG. 17 shows, in section (a), initial regions 431 and 432 that are respectively defined by first initial region information and second initial region information that are read from the initial region table 130. The initial regions 431 and 432 are each rectangular. FIG. 17 also shows, in section (a), a track 430 of touch positions touched by the operation body. The track 430 intersects with the initial regions 431 and 432 as shown in the figure.

Also, FIG. 17 shows, in section (b), an example of a relationship between variation of the touch movement speed v over time and each of the first threshold value v1, the second threshold value v2, and the third threshold value v3. In the figure, the horizontal axis is coincident with the X-axis direction in the display screen of the touch panel 111, and the vertical axis represents the touch movement speed of the operation body. Note that the horizontal axis in section (b) in FIG. 17 is coincident with the horizontal axis in section (a) in FIG. 17. Also, FIG. 17 shows, in section (b), variation 435 of the touch movement speed v over time.

As shown in section (b) in FIG. 17, when the operation body is positioned at a touch position $T_{70}$ immediately after starting moving, the touch movement speed v is less than the first threshold value v1. As the operation body moves, the touch movement speed v increases. However, when the operation body is positioned at a touch position $T_{71}$ that is a start position of an initial region 431, the touch movement speed V is still less than the first threshold value v1. The touch movement speed v further increases. Then, when the operation body is positioned at a touch position $T_{72}$ that is positioned inside the initial region 431, the touch movement speed v equalizes the first threshold value v1. When the operation body is positioned at positions subsequent to the touch position $T_{72}$, the touch movement speed v further increases, and exceeds the first threshold value v1. When the operation body is positioned at each of an end position $T_{74}$ of the initial region 431, a touch position $T_{75}$ that is a start position of the initial region 432, and a touch position $T_{78}$ that is an end position of the initial region 432, the touch movement speed v is kept to a constant value, and is greater than the first threshold value v1 and less than the second threshold value v2.

In this case, when the operation body is positioned at a touch position $T_{71}$ that is a start position of the initial region 431, the touch movement speed v is less than the first threshold value v1. Accordingly, the region setting unit 111c generates a reaction region by using the initial region 431 with no reduction.

Next, when the operation body is at the positions subsequent to the touch position $T_{72}$ which is positioned inside the initial region 431, the touch movement speed v is greater than the first threshold value v1. Accordingly, when the operation body is at the positions subsequent to the touch position $T_{72}$, the region setting unit 111c generates a reaction region by reducing the initial region 431. An end position of the reaction region is a touch position $T_{73}$.

In this way, in the case where the touch movement speed v exceeds the first threshold value v1 while the operation body moves on the initial region 431, the region setting unit 111c generates a reaction region by using the initial region 431 with no reduction with respect to a touch position where the touch movement speed v is less than the first threshold value v1. On the other hand, with respect to a touch position where the touch movement speed v is equal to or greater than the first threshold value v1 and is less than the second threshold value v2, the region setting unit 111c generates a reaction region by reducing the initial region 431 as shown in section (a) in FIG. 5. In this way, a reaction region generation method changes while the operation body moves on one reaction region, from the method of generating a reaction region by using an initial region with no reduction to the method of generating a reaction region by reducing an initial region anteriorly and posteriorly in the touch movement direction of the operation body. This results in variation of reaction regions with respect to the one initial region.

For this reason, the region setting unit 111c generates a reaction region 433 shown in section (a) in FIG. 17, in consideration of time lapse. The reaction region 433 starts at the touch position $T_{71}$, which is coincident with the start position of the initial region 431, and ends at the touch position $T_{73}$.

Next, when the operation body is positioned at the touch positions $T_{75}$ to $T_{78}$, the second threshold value v is greater than the first threshold value v1 and is less than the second threshold value v2. Accordingly, the region setting unit 111c reduces the initial region 432 anteriorly and posteriorly by ⅓ in the touch movement direction of the operation body, and thereby to generate a rectangular reaction region 434. This case is the same as the case shown in section (a) in FIG. 5. The reaction region 434 starts at the touch position $T_{76}$ and ends at the touch position $T_{77}$.

When the operation body touches the touch position $T_{71}$, the vibration control unit 111e controls the vibrator 111f to vibrate. The vibrator 111f continues to vibrate until when vibration occurring in response to touch made to the touch position $T_{73}$ by the operation body ends. Also, when the operation body touches the touch position $T_{76}$, the vibration control unit 111e controls the vibrator 111f to vibrate. The vibrator 111f continues to vibrate until when vibration occurring in response to touch made to the touch position $T_{77}$ by the operation body ends.

In this way, the vibrator 111f continues to vibrate for each of vibration durations 436 and 437 shown in section (c) in FIG. 17. The vibration duration 436 starts when the operation body touches the touch position $T_{71}$, and ends when vibration occurring in response to touch made to the touch position $T_{73}$ by the operation body ends. The vibration duration 437 starts when the operation body touches the touch position $T_{76}$, and ends when vibration occurring in response to touch made to the touch position $T_{77}$ by the operation body ends.

(Summary) In the case where the touch movement speed v of the operation body exceeds the threshold value while the operation body moves on one initial region, the region setting unit 111c changes the reaction region generation method while the operation body moves on the one initial region. This provides a time interval between each two vibrations.

(6) The following describes the case where the touch movement speed v of the operation body falls below the threshold value while the operation body moves on one initial region on the touch panel 111 in touch with the touch panel 111.

Figure 18:
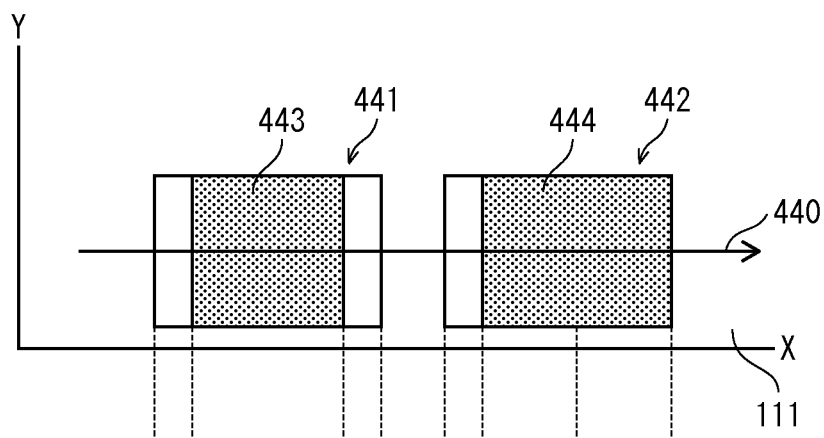
FIG. 18 shows: in section (a) an example of reaction regions that are generated in the case where the touch movement speed v falls below the threshold value while the operation body moves on one initial region; in section (b) an example of a relationship between variation of the touch movement speed v over time and each of the first threshold values; and in section (c) an example of variation of vibration with variation of touch positions.
Figure 18:
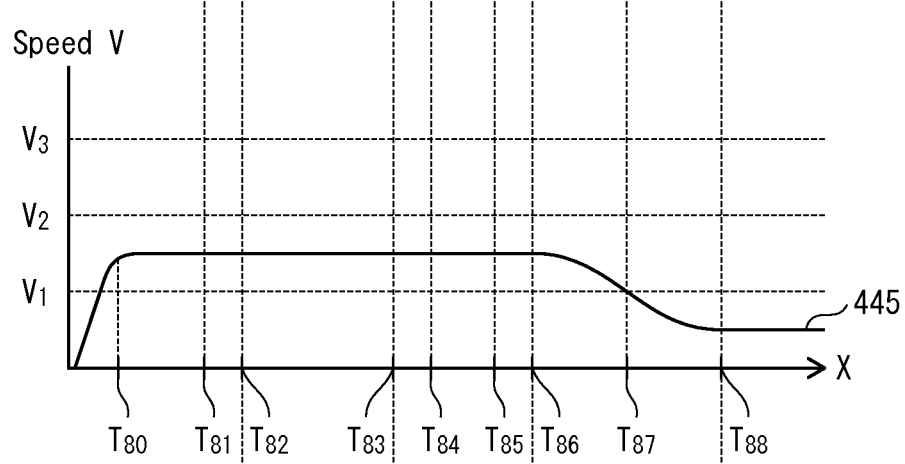
Figure 18:
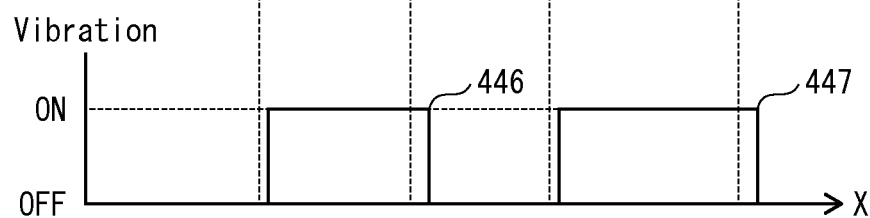

FIG. 18 shows, in section (a), an example of part of the display screen of the touch panel 111. In the figure, the horizontal axis and the vertical axis are respectively coincident with the X-axis direction and the Y-axis direction in the display screen of the touch panel 111.

FIG. 18 shows, in section (a), initial regions 441 and 442 that are respectively defined by first initial region information and second initial region information that are read from the initial region table 130. The initial region 441 and the initial region 442 are each rectangular. FIG. 18 also shows, in section (a), a track 440 of touch positions touched by the operation body. The track 440 intersects with the initial regions 441 and 442 as shown in the figure.

Also, FIG. 18 shows, in section (b), an example of a relationship between variation of the touch movement speed v over time and each of the first threshold value v1, the second threshold value v2, and the third threshold value v3.

In the figure, the horizontal axis is coincident with the X-axis direction in the display screen of the touch panel 111, and the vertical axis represents the touch movement speed of the operation body. Note that the horizontal axis in section (b) in FIG. 18 is coincident with the horizontal axis in section (a) in FIG. 18. Also, FIG. 18 shows, in section (b), variation 445 of the touch movement speed v over time.

As shown in section (b) in FIG. 18, when the operation body is positioned at a position $T_{80}$ immediately after starting moving, the touch movement speed v is greater than the first threshold value v1 and is less than the second threshold value v2. When the operation body is positioned at positions subsequent to the position $T_{80}$, namely, from a touch position $T_{81}$ that is a start position of the initial region 441 to a touch position $T_{84}$ that is an end position of the initial region 441, the touch movement speed v is kept to a constant value, and is greater than the first threshold value v1 and less than the second threshold value v2. Then, when the operation body is positioned at positions from a touch position $T_{85}$ that is a start position of the region 442 to a touch position $T_{86}$ that is an end position of the initial region 442, the touch movement speed v is kept to a constant value, and is greater than the first threshold value v1 and less than the second threshold value v2. When the operation body is positioned at positions subsequent to the position $T_{86}$, the touch movement speed v decreases. When the operation body is positioned at a position $T_{87}$ that is positioned inside the initial region 442, the touch movement speed v equalizes the first threshold value v1. Then, the touch movement speed v further decreases. When the operation body is positioned at a touch position $T_{88}$ that is an end position of the initial region 441, the touch movement speed v falls below the first threshold value v1, and then is kept to a constant value.

In this case, the touch movement speed v is greater than the first threshold value v1 and is less than the second threshold value v2 at all the touch positions that are positioned inside the initial region 441. Accordingly, the region setting unit 111c reduces the initial region 441 anteriorly and posteriorly by ⅓ in the touch movement direction of the operation body which is indicated by the track 440, and thereby to generate a reaction region 443, in the same manner as in the case shown in section (a) in FIG. 5. The reaction region 443 starts at the touch position $T_{82}$ and ends at the touch position $T_{83}$.

Then, until the operation body reaches a touch position $T_{87}$, the touch movement speed v is greater than the first threshold value v1 and less than the second threshold value v2. Accordingly, the region setting unit 111c reduces the initial region 442 anteriorly and posteriorly by ⅓ in the touch movement direction which is indicated by the track 440, and thereby to generate a reaction region, in the same manner as in the case shown in section (a) in FIG. 5. This reaction region starts from the touch position $T_{86}$. Next, when the operation body is positioned at the touch position $T_{87}$ that is positioned inside the initial region 442, the touch movement speed v falls below the first threshold value v1. Accordingly, when the operation body is positioned at positions subsequent to the position $T_{87}$, the region setting unit 111c generates a reaction region by using the initial region 442 with no reduction. This reaction region ends at the touch position $T_{88}$.

In this way, in the case where the touch movement speed v falls below the first threshold value v1 while the operation body moves on the initial region 442, the region setting unit 111c generates a reaction region by reducing the initial region 442 in the same manner as in the case shown in section (a) in FIG. 5, with respect to a position where the touch movement speed v is equal to or greater than the first threshold value v1 and is less than the second threshold value v2. On the other hand, with respect to a position where the touch movement speed v is less than the first threshold value v1, the region setting unit 111c generates a reaction region by using the initial region 442 with no reduction. In this way, the reaction region generation method changes while the operation body moves on one reaction region, from the method of generating a reaction region by reducing an initial region anteriorly and posteriorly in the touch movement direction of the operation body to the method of generating a reaction region by using an initial region with no reduction. This results in variation of reaction regions with respect to the one initial region.

For this reason, the region setting unit 111c generates a reaction region 444 shown in section (a) in FIG. 18, in consideration of time lapse. The reaction region 444 starts at the touch position $T_{86}$, and ends at the touch position $T_{88}$, which is coincident with the end position of the initial region 442.

When the operation body touches the touch position $T_{82}$, the vibration control unit 111e controls the vibrator 111f to vibrate. The vibrator 111f continues to vibrate until when vibration occurring in response to touch made to the touch position $T_{83}$ by the operation body ends. Also, when the operation body touches the touch position $T_{86}$, the vibration control unit 111e controls the vibrator 111f to vibrate. The vibrator 111f continues to vibrate until when vibration occurring in response to touch made to the touch position $T_{88}$ by the operation body ends.

In this way, the vibrator 111f continues to vibrate for each of vibration durations 446 and 447 shown in section (c) in FIG. 18. The vibration duration 446 starts when the operation body touches the touch position $T_{82}$, and ends when vibration occurring in response to touch made to the touch position $T_{83}$ by the operation body ends. The vibration duration 447 starts when the operation body touches the touch position $T_{86}$, and ends when vibration occurring in response to touch made to the touch position $T_{88}$ by the operation body ends.

(Summary) In the case where the touch movement speed v of the operation body falls below while the operation body moves on one initial region, the region setting unit 111c changes the reaction region generation method while the operation body moves on the one initial region. This further narrows a time interval between each two vibrations.

(7) A touch panel 111x (not illustrated) as a modification has the similar configuration to the touch panel 111 relating to the above embodiment. The following mainly describes difference between the touch panel 111x and the touch panel 111.

(Touch Panel 111x)

(I) A region setting unit 111c calculates predicted track information indicating a predicted track an operation body is predicted to follow, as described in the above embodiment. Also, the region setting unit 111c reads, from an initial region table 130, a plurality of pieces of initial region information each defining an initial region that intersects with the calculated predicted track.

(II) A region setting unit 111c stores therein a section threshold value $d_m$.

Upon reading the pieces of initial region information, a vibration control unit 111e extracts first initial region information defining a first initial region and second initial region information defining a second initial region that is adjacent to the first initial region, among the read pieces of initial region information. Here, the following conditions are satisfied: (i) the second initial region is adjacent anteriorly to the first initial region in a direction indicated by the predicted track; and (ii) no initial region exists between the first initial region and the second initial region.

Figure 19:
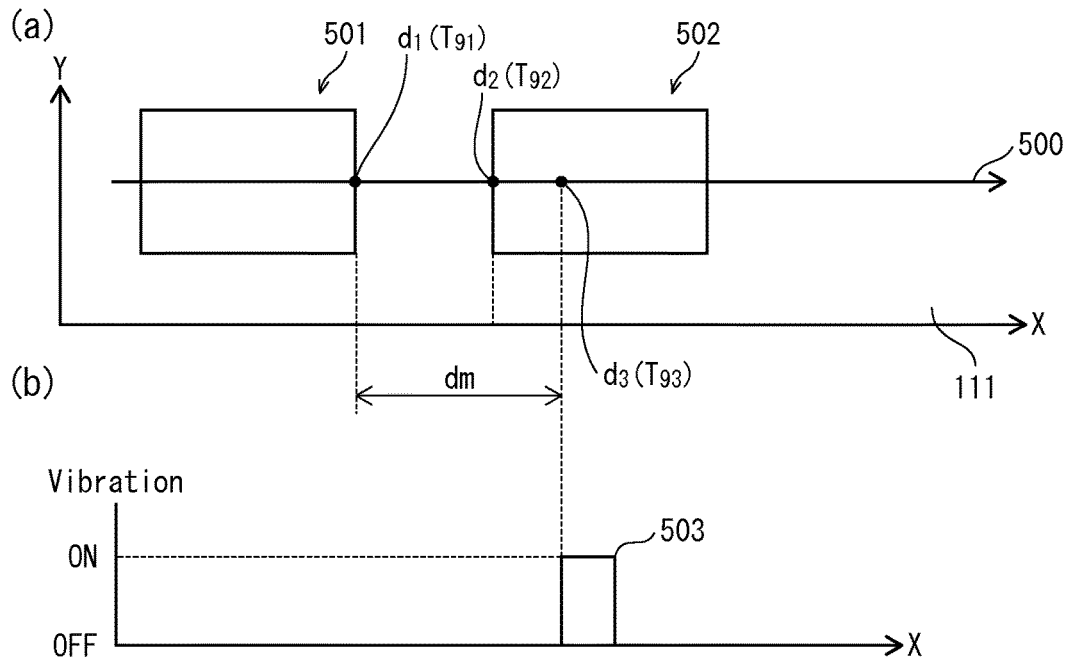
FIG. 19 shows: in section (a) arrangement of a first initial region 501 and a second initial region 502 in the case where a distance between an end point $d_1$ and a start point $d_2$ is equal to or less than a section threshold value $d_m$; and an example of variation of vibration in section (b).

FIG. 19 shows, in section (a), an example of part of the display screen of the touch panel 111. In the figure, the horizontal axis and the vertical axis are respectively coincident with the X-axis direction and the Y-axis direction in the display screen of the touch panel 111.

FIG. 19 shows, in section (a), a first initial region 501 and a second initial region 502 that are respectively defined by first initial region information and second initial region information that are read from the initial region table 130. The first initial region 501 and the second initial region 502 are each rectangular. Also, FIG. 19 shows, in section (a), a predicted track 500 of the operation body. The predicted track 500 intersects with the first initial region 501 and the second initial region 502 as shown in the figure.

Furthermore, FIG. 19 shows, in section (a), an end point $d_1$ ($T_{91}$) of the first initial region 501 and a start point $d_2$ ($T_{92}$) of the second initial region 502. A distance between the end point $d_1$ ($T_{91}$) and the start point $d_2$ ($T_{92}$) is less than the section threshold value $d_m$. Note that description is given later on the end point $d_1$ and the start point $d_2$.

Figure 20:
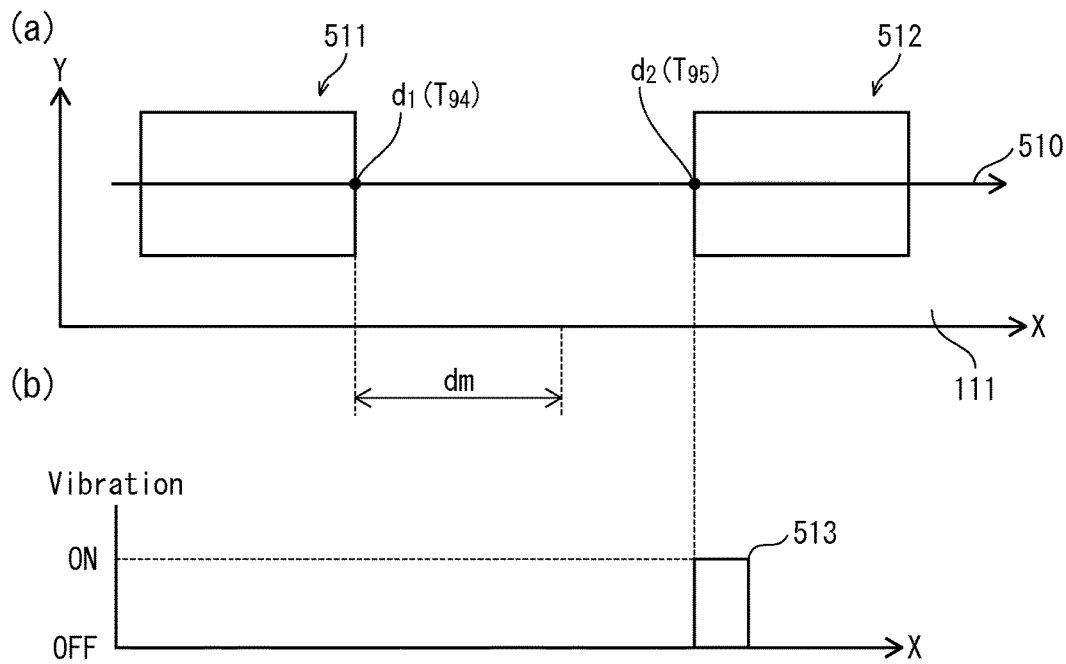
FIG. 20 shows: in section (a) arrangement of a first initial region 511 and a second initial region 512 in the case where a distance between an end point $d_1$ and a start point $d_2$ is greater than the section threshold value $d_m$; in section (b) and an example of variation of vibration.

FIG. 20 shows, in section (a), another example of part of the display screen of the touch panel 111. In the figure, the horizontal axis and the vertical axis are respectively coincident with the X-axis direction and the Y-axis direction in the display screen of the touch panel 111.

FIG. 20 shows, in section (a), a first initial region 511 and a second initial region 512 that are respectively defined by first initial region information and second initial region information that are read from the initial region table 130. The first initial region 511 and the second initial region 512 are each rectangular. Also, FIG. 20 shows, in section (a), a predicted track 510 of the operation body. The predicted track 510 intersects with the first initial region 511 and the second initial region 512 as shown in the figure.

Furthermore, FIG. 20 shows, in section (a), an end point $d_1$ ($T_{94}$) of the first initial region 511 and a start point $d_2$ ($T_{95}$) of the second initial region 512. A distance between the end point $d_1$ ($T_{94}$) and the start point $d_2$ ($T_{95}$) is greater than the section threshold value $d_m$.

Note that although the operation body moves in parallel to the X-axis in respective sections (a) in FIG. 19 and FIG. 20, the operation body may move in parallel to the Y-axis. Alternatively, the operation body may move not in parallel either to the X-axis or to the Y-axis, as shown in FIG. 21 and FIG. 22.

Figure 21:
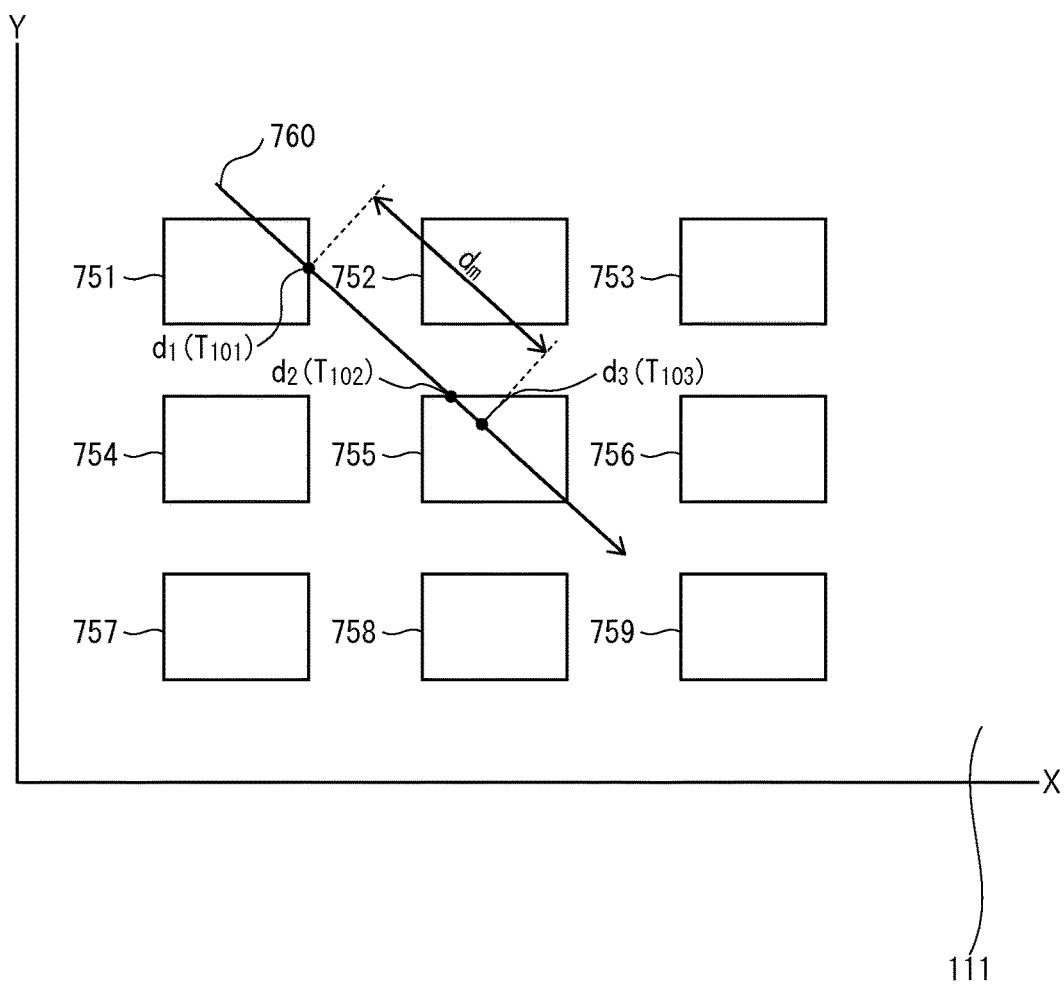
FIG. 21 shows arrangement of a first initial region 751 and a second initial region 755 in the case where a distance between an end point $d_1$ and a start point $d_2$ is equal to or less than the section threshold value $d_m$.

FIG. 21 shows initial regions 751, 752, . . . , 759 that are arranged in matrix. Also, FIG. 21 shows a track 760 of touch positions touched by the operation body. The track 760 intersects with the first initial region 751 and the second initial region 755. Furthermore, FIG. 21 shows an end point $d_1$ ($T_{101}$) of the first initial region 751 and a start point $d_2$ ($T_{102}$) of the second initial region 755. A distance between the end point $d_1$ ($T_{101}$) and the start point $d_2$ ($T_{102}$) is less than the section threshold value $d_m$.

Figure 22:
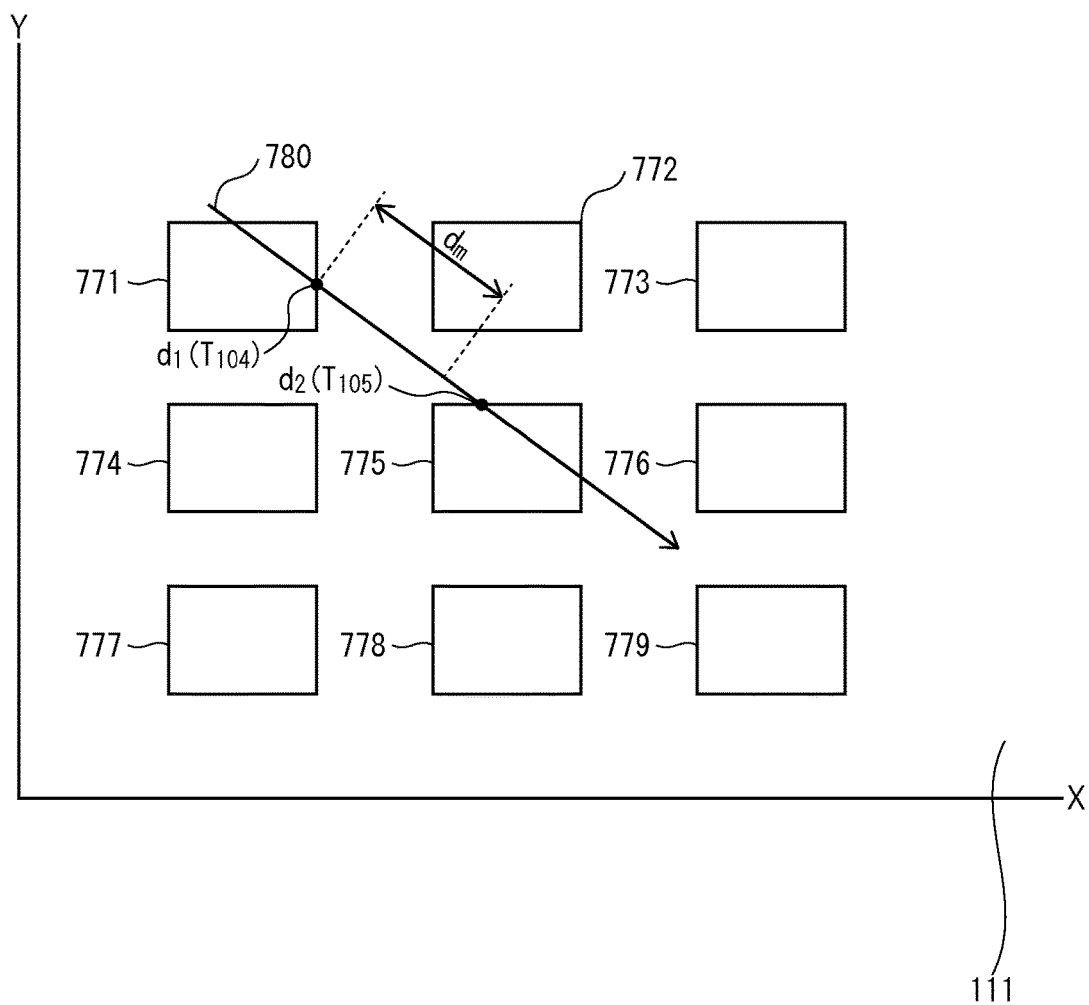
FIG. 22 shows arrangement of a first initial region 771 and a second initial region 775 in the case where a distance between an end point $d_1$ and a start point $d_2$ is greater than the section threshold value $d_m$.

Also, FIG. 22 shows initial regions 771, 772, . . . , 779 that are arranged in matrix. Also, FIG. 22 shows a track 780 of touch positions touched by the operation body. The track 780 intersects with the first initial region 771 and the second initial region 775. Furthermore, FIG. 22 shows an end point $d_1$ ($T_{104}$) of the first initial region 771 and a start point $d_2$ ($T_{105}$) of the second initial region 775. A distance between the end point $d_1$ ($T_{104}$) and the start point $d_2$ ($T_{105}$) is greater than the section threshold value $d_m$.

(III) Next, the region setting unit 111c calculates the end point $d_1$ of the first initial region defined by the first initial region information. Here, the end point $d_1$ of the first initial region is an intersection point that is positioned downstream in a direction indicated by the predicted track among two intersection points where a border of the first initial region intersects with the predicted track. The end point $d_1$ is expressed by the X-coordinate value and the Y-coordinate value.

Next, the region setting unit 111 calculates the end point $d_2$ of the second initial region defined by the second initial region information. Here, the start point $d_2$ of the second initial region is an intersection point that is positioned upstream in a direction indicated by the predicted track among two intersection points where a border of the second initial region intersects with the predicted track. The start point $d_2$ is expressed by the X-coordinate value and the Y-coordinate value.

(IV) Next, the region setting unit 111c calculates a distance $\Delta d$ between the start point $d_2$ and the end point $d_1$ by the following equation.

$$\Delta d = |d_2 - d_1|$$

$$= \text{square root}((x2-x1)^2 + (y2-y1)^2)$$

Here, |a−b| represents the distance between a point a and a point b. Also, x1 and y1 respectively represent an X-coordinate value and a Y-coordinate value of the end point $d_1$, and x2 and y2 respectively represent an X-coordinate value and a Y-coordinate value of the start point $d_2$. Furthermore, a^2 represents square operation of a.

A distance $\Delta d$ between the end point $d_1$ ($T_{91}$) and the start point $d_2$ ($T_{92}$) shown in section (a) in FIG. 19 is less than the section threshold value $d_m$. On the other hand, a distance $\Delta d$ between the end point $d_1$ ($T_{94}$) and the start point $d_2$ ($T_{95}$) shown in section (a) in FIG. 20 is greater than the section threshold value $d_m$.

Also, a distance $\Delta d$ between the end point $d_1$ ($T_{101}$) and the start point $d_2$ ($T_{102}$) shown in FIG. 21 is less than the section threshold value $d_m$. On the other hand, a distance $\Delta d$ between the end point $d_1$ ($T_{104}$) and the start point $d_2$ ($T_{105}$) shown in FIG. 22 is greater than the section threshold value $d_m$.

(5) Next, the region setting unit 111c compares the distance $\Delta d$ with the section threshold value $d_m$.

(5-1) In the case where the distance $\Delta d$ is greater than the section threshold value $d_m$, the region setting unit 111c sets the start point $d_2$ as a vibration point. The vibration control unit 111e controls the vibrator 111f to start vibrating at a time when the operation body touches the start point $d_2$ which is the vibration point. The vibrator 111f starts vibrating at the time when the operation body touches the start point $d_2$ which is the vibration point.

In the case shown in section (a) in FIG. 20, the vibrator 111f starts vibrating at a time when the operation body touches the start point $d_2$ ($T_{95}$). Also, the vibrator 111f vibrates for a vibration duration 513 as shown in section (b) in FIG. 20. The vibration duration 513 starts when the operation body touches the start point $d_2$ ($T_{95}$).

Also, in the case shown in FIG. 22, the vibrator 111f starts vibrating at a time when the operation body touches the start point $d_2$ ($T_{105}$) which is the vibration point.

(5-2) In the case where the distance $\Delta d$ is equal to or less than the section threshold value $d_m$, the region setting unit 111c calculates a vibration point $d_3$ as shown below.

(i) Case where the Operation Body Moves in Parallel to the X-Axis $$x3 = x1 \pm d_m$$

$$y3 = y1$$

Here, x1 and y1 respectively represent an X-coordinate value and a Y-coordinate value of the end point $d_1$. Also, x3 and y3 respectively represent an x-coordinate value and a y-coordinate value of the vibration point $d_3$.

(ii) Case where the Operation Body Moves in Parallel to the Y-Axis $$x3 = x1$$

$$y3 = y1 \pm d_m$$

Here, x1 and y1 respectively represent an X-coordinate value and a Y-coordinate value of the end point $d_1$. Also, x3 and y3 respectively represent an x-coordinate value and a y-coordinate value of the vibration point $d_3$.

(iii) Case where the Operation Body Moves not in Parallel Either to the X-Axis or to the Y-Axis The vibration point $d_3$ that satisfies the following two equations is calculated.

$$d_m{}^2 = (x3-x1)^2 + (y3-y1)^2$$

$$a = (y3-y1)/(x3-x1)$$

Here, x1 and y1 respectively represent an X-coordinate value and a Y-coordinate value of the end point $d_1$. Also, x3 and y3 respectively represent an x-coordinate value and a y-coordinate value of the vibration point $d_3$. Furthermore, a represents slope on the x-y coordinates of a straight line indicating the predicted track.

In this way, the region setting unit 111c calculates the vibration point $d_3$ by moving the end point $d_1$ on the predicted track anteriorly in the touch movement direction by the section threshold value $d_m$.

The vibration control unit 111e controls the vibrator 111f to start vibrating at a time when the operation body touches the vibration point $d_3$. The vibrator 111f starts vibrating at the time when the operation body touches the vibration point $d_3$.

In the case shown in section (a) in FIG. 19, the vibrator 111f starts vibrating at a time when the operation body touches the vibration point $d_3$ ($T_{93}$). Also, the vibrator 111f vibrates for a vibration duration 503 as shown in section (b) in FIG. 19. The vibration duration 503 starts when the operation body touches the start point $d_3$ ($T_{93}$).

Also, in the case shown in FIG. 21, the vibrator 111f starts vibrating at a time when the operation body touches the start point $d_3$ ($T_{103}$).

(Operations of Touch Panel 111x)

Figure 23:
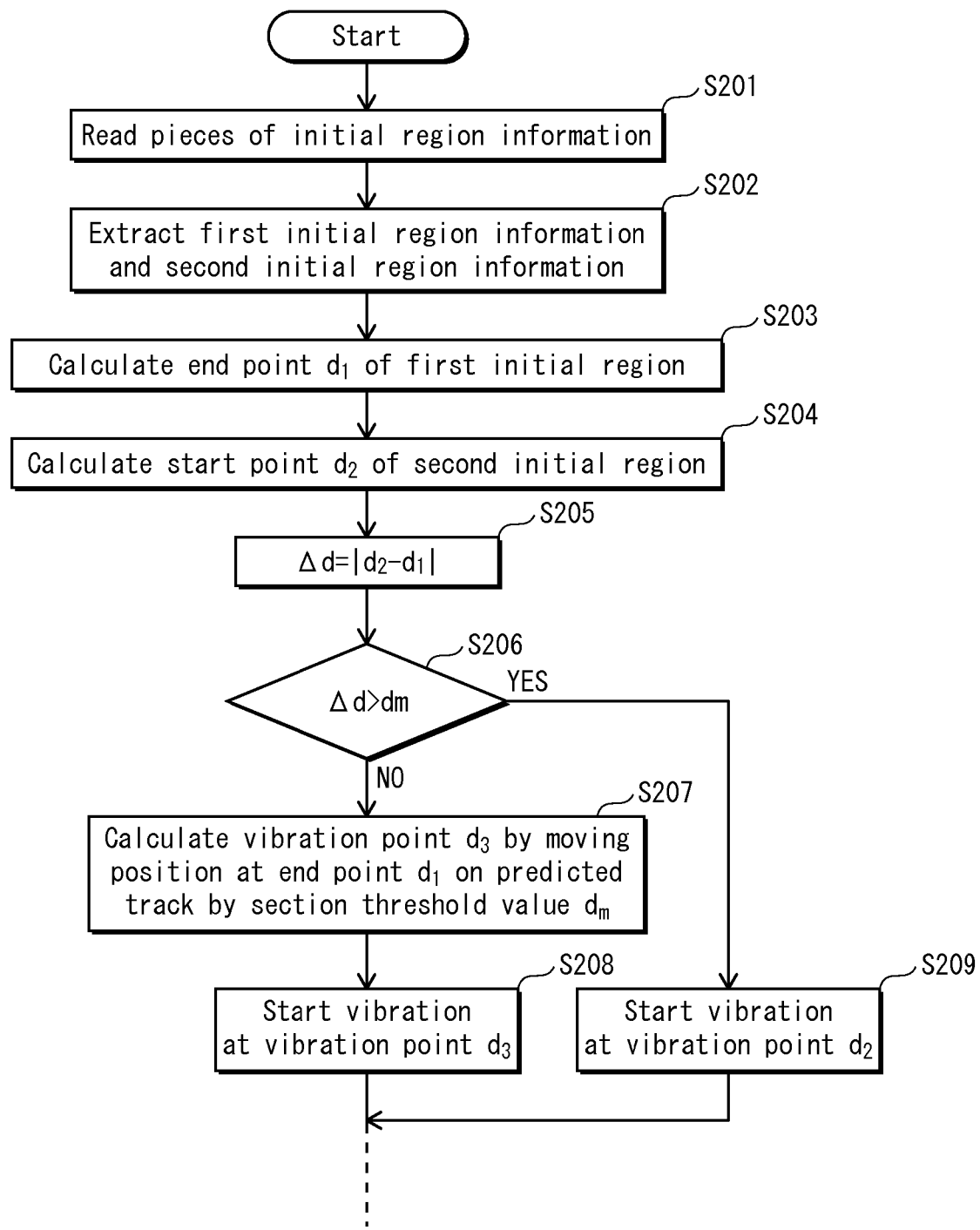
FIG. 23 is a flow chart showing operations of a touch panel 111x as a modification.

Next, description is given on the operations of the touch panel 111x with reference to a flow chart shown in FIG. 23.

The region setting unit 111c reads a plurality of pieces of initial region information, and calculates a predicted track (Step S201). Next, the region setting unit 111c extracts first initial region information and second initial region information among the pieces of initial region information (Step S202).

Next, the region setting unit 111c calculates an end point $d_1$ of a first initial region defined by the first initial region information (Step S203). Also, the region setting unit 111c calculates a start point $d_2$ of a second initial region defined by the second initial region information (Step S204).

Next, the region setting unit 111c calculates a distance Δd between the start point $d_2$ and the end point $d_1$ (Step S205).

Next, the region setting unit 111c compares the distance Δd with the section threshold value $d_m$ (Step S206).

When the distance Δd is greater than the section threshold value $d_m$ (Step S206: YES), the region setting unit 111c sets the start point $d_2$ as a vibration point. The vibration control unit 111e controls the vibrator 111f to start vibrating at a time when the operation body touches the vibration point $d_2$. The vibrator 111f starts vibrating at the time when the operation body touches the start point $d_2$ (Step S209).

On the other hand, when the distance Δd is equal to or less than the section threshold value $d_m$ (Step S206: NO), the region setting unit 111c calculates, as a vibration point $d_3$, a point resulting from moving the end point $d_1$ on the predicted track anteriorly in the touch movement direction by the section threshold value $d_m$ (Step S207). Next, the vibration control unit 111e controls the vibrator 111f to start vibrating at a time when the operation body touches the vibration point $d_3$. The vibrator 111f starts vibrating at the time when the operation body touches the vibration point $d_3$ (Step S208).

(Summary) As described above, the region setting unit 111c stores therein a plurality of pieces of initial region information each indicating position and size of an initial region on the screen, the region setting unit 111c specifies a first region and a second region that intersect with a predicted track among the respective regions defined by the plurality of pieces of initial region information, the predicted track indicating a track the operation body is predicted to follow, calculates a distance between the first region and the second region on the predicted track, and sets a vibration point that is positioned inside the second region in accordance with the calculated distance, the second region being positioned further downstream than the first region on the predicted track. The vibration control unit 111e judges whether the operation body is positioned at the vibration point with use of a touch position that is detected after the vibration point is set. In the case where the operation body is positioned at the vibration point, the vibration control unit 111e controls the vibrator to vibrate.

According to this configuration, vibration of the vibrator is controlled in accordance with a distance between each two regions. This allows the user to distinguish between respective vibrations occurring in response to touch to the two regions.

Also, the region setting unit 111c calculates an intersection point of the first region where a border of the first region intersects with the predicted track most downstream on the predicted track and an intersection point of the second region where a border of the second region intersects with the predicted track most upstream on the predicted track, the region setting unit 111c calculates, as the distance between the first region and the second region on the predicted track, a distance between the intersection point of the first region and the intersection point of the second region, and when the distance is greater than a difference threshold value, the region setting unit 111c sets the intersection point of the second region as the vibration point.

According to this configuration, the distance between the end intersection point and the start intersection point is calculated, and in the case where the calculated distance is greater than the difference threshold value, the start intersection point is set to the vibration point. In this case, there is a time interval between an end time of vibration occurring in response to touch to the first region and a start time of vibration occurring in response to touch to the second region. This allows the user to distinguish between respective vibrations occurring in response to touch to the two regions.

Furthermore, when the distance is equal to or less than the difference threshold value, the region setting unit 111c calculates, as the vibration point, a point resulting from moving the intersection point of the first region downstream on the predicted track by the difference threshold value.

According to this configuration, when the distance is equal to or less than the difference threshold value, the point, which results from moving the intersection point of the first region downstream on the predicted track by the difference threshold value, is set as the vibration point. The vibrator is controlled to vibrate at the vibration point. Accordingly, it is possible to provide a temporal interval between a start time point of vibration occurring in response to touch to the first region and an end time point of vibration occurring in response to touch to the second region.

(8) In the above embodiment and modifications, in the case where a touch position touched by the operation body is positioned inside a reaction region, or in the case where the operation body is positioned inside the reaction region, the vibration control unit 111e may further control the power lamp 113 to flash while controlling the vibrator 111f to vibrate.

(9) In the above embodiment and modifications, the region setting unit 111c stores therein the first threshold value v1, the second threshold value v2, and the third threshold value v3. The first threshold value v1, the second threshold value v2, and the third threshold value v3 are each compared with the touch movement speed v of the operation body. However, a threshold value to be stored and compared is not limited to these threshold values.

Alternatively, the region setting unit 111c may store therein the first threshold value v1 and the third threshold value v3, and may not store therein the second threshold value v2. In this case, the first threshold value v1 and the third threshold value v3 are each compared with the touch movement speed v of the operation body.

Further alternatively, the region setting unit 111c may store therein, in addition to the second threshold value v2, other one or more threshold values that are each greater than the first threshold value v1 and less than the third threshold value v3. In this case, the first threshold value v1, the second threshold value v2, the third threshold value v3, and the other threshold values are each compared with the touch movement speed v of the operation body.

(10) In the above embodiment and modifications, the touch panel 111, which is an input device vibrates to inform a user of that an operation body touches a region on a screen, the region being for receiving an operation instruction allocated to the region, may include: a touch position detection module configured to repeatedly detect a touch position on the screen touched by the operation body while the operation body is in touch with the screen; a speed calculation module configured to calculate a touch movement speed at each detected touch position, the touch movement speed indicating a speed at which the operation body moves on the screen while being in touch with the screen; a vibrator; a region setting module configured to compare the touch movement speed at a touch position detected at a first time point with a threshold value, (i) when the touch movement speed is less than the threshold value, set a reaction region with a first area on the screen so as to be positioned anterior to the detected touch position in a touch movement direction of the operation body, and (ii) when the touch movement speed is equal to or greater than the threshold value, set a region with a second area on the screen so as to be positioned anterior to the detected touch position in the touch movement direction, the reaction region with the second area being smaller than the reaction region with the first area; and a vibration control module configured to judge whether the operation body is positioned inside the set reaction region, with use of a touch position detected at a second time point after the reaction region is set, when the operation body is positioned inside the set reaction region, control the vibrator to vibrate, and when the operation body is not positioned inside the set reaction region, control the vibrator not to vibrate.

(11) The above devices each may be a computer system that includes a microprocessor and a memory. The memory may store therein a computer program, and the microprocessor may operate in accordance with the computer program.

Here, the computer program is composed of combinations of instruction codes each indicating an instruction to a computer for achieving predetermined functions.

Also, the computer program may be recorded in a computer-readable recording medium such as a flexible disk, a hard disk, a CD-ROM, an MO, a DVD, a DVD-ROM, a DVD-RAM, a BD (Blu-ray Disc), and a semiconductor memory.

Also, the computer program may be transmitted via an electric communication network, a wireless or wired communication network, a network represented by the Internet, data broadcasting, or the like.

Furthermore, the present invention may be implemented by another computer system, by transmitting the computer program recorded in the recording medium to the other computer system, or by transmitting the computer program to the other computer system via the network.

(12) The present invention may be any combination of the above embodiment and modifications.

(13) One aspect of the present invention provides an input device that vibrates to inform a user of that an operation body touches a region on a screen, the region being for receiving an operation instruction allocated to the region, the input device comprising: a touch position detection module configured to repeatedly detect a touch position on the screen touched by the operation body while the operation body is in touch with the screen; a speed calculation module configured to calculate a movement speed at each detected touch position, the movement speed indicating a speed at which the operation body moves on the screen while being in touch with the screen; a vibrator; a region setting module configured to compare the movement speed at a touch position detected at a first time point with a threshold value, (i) when the movement speed is less than the threshold value, set a first reaction region on the screen so as to be positioned anterior to the detected touch position in a movement direction of the operation body, and (ii) when the movement speed is equal to or greater than the threshold value, set a second reaction region on the screen so as to be positioned anterior to the detected touch position in the movement direction, the second reaction region being smaller than the first reaction region; and a vibration control module configured to judge whether the operation body is positioned inside the set reaction region, with use of a touch position detected at a second time point after the reaction region is set, when the operation body is positioned inside the set reaction region, control the vibrator to vibrate, and when the operation body is not positioned inside the set reaction region, control the vibrator not to vibrate.

According to the above aspect, when the movement speed at the detected touch position is equal to or greater than the threshold value, the second reaction region, which is smaller than the first reaction region, is set on the screen so as to be positioned anterior to the detected touch position in the movement direction. Also, when the operation body is positioned inside the second reaction region after the second reaction region is set, the vibrator vibrates. Accordingly, it is possible to provide a temporal interval between a start time point of vibration occurring in response to touch to the second reaction region and an end time point of an immediately previous vibration thereof. This allows the user to distinguish between the vibration occurring in response to touch to the second reaction region and the immediately previous vibration.

Here, the region setting module may store therein initial region information indicating position and size of an initial region on the screen, when the movement speed is less than the threshold value and the initial region defined by the initial region information is positioned anterior to the touch position in the movement direction, the region setting module may set the initial region as the first reaction region, and when the movement speed is equal to or greater than the threshold value and the initial region is positioned anterior to the touch position in the movement direction, the region setting module may set a region that is smaller than the initial region as the second reaction region.

According to this aspect, when the movement speed at the detected touch position is equal to or greater than the threshold value, the second reaction region, which is smaller than the initial region, is set on the screen. Accordingly, it is possible to provide a temporal interval between a start time point of vibration occurring in response to touch to the second reaction region and an end time point of an immediately previous vibration thereof.

Here, when the movement speed is equal to or greater than the threshold value, the region setting module may reduce the initial region anteriorly, posteriorly, or both anteriorly and posteriorly in the movement direction, and set a region resulting from the reduction as the second reaction region.

According to this aspect, the initial region is reduced anteriorly, posteriorly, or both anteriorly and posteriorly in the movement direction, and sets a region resulting from the reduction as the second reaction region. Accordingly, it is possible to provide a temporal interval between a start time point of vibration occurring in response to touch to the second reaction region and an end time point of an immediately previous vibration thereof.

Here, when the movement speed is equal to or greater than the threshold value and is less than a sub threshold value, the region setting module may make a first reduction to the initial region, and set a region resulting from the first reduction as the second reaction region, when the movement speed is equal to or greater than the threshold value and is equal to or greater than the sub threshold value, the region setting module may make a second reduction to the initial region, and set a region resulting from the second reduction as the second reaction region, the sub threshold value may be greater than the threshold value, and the second reduction may be greater in degree than the first reduction.

According to this aspect, when the moving speed is equal to or greater than the threshold value and is less than the sub threshold value, the first reduction is made. Also, when the movement speed is equal to or greater than the threshold value and is equal to or greater than the sub threshold value, the second reduction is made. Here, the second reduction is greater in degree than the first reduction. Accordingly, further fast movement of the operation body results in further reduction of the second reaction region. Accordingly, it is possible to provide a further long temporal interval between a start time point of vibration occurring in response to touch to the second reaction region and an end time point of an immediately previous vibration thereof.

Here, the region setting module may set a line segment resulting from the second reduction as the second reaction region, the line segment being positioned inside the initial region and being perpendicular to the movement direction.

According to this aspect, the line segment, which results from the second reduction and is positioned inside the initial region and perpendicular to the movement direction, is set as the second reaction region. Accordingly, it is possible to provide a further long temporal interval between a start time point of vibration occurring in response to touch to the second reaction region and an end time point of an immediately previous vibration thereof.

Here, the region setting module may store therein a plurality of pieces of initial region information each indicating position and size of an initial region on the screen, the region setting module may specify a first region and a second region that intersect with a predicted track among the respective regions defined by the plurality of pieces of initial region information, the predicted track indicating a track the operation body is predicted to follow, calculate a distance between the first region and the second region on the predicted track, and set a vibration point that is positioned inside the second region in accordance with the calculated distance, the second region being positioned further downstream than the first region on the predicted track, and the vibration control module may judge whether the operation body is positioned at the vibration point, with use of a touch position detected after the vibration point is set, and when judging that the operation body is positioned at the vibration point, the vibration control module may control the vibrator to vibrate.

According to this aspect, the vibration is set in accordance with the distance between the two regions. When the operation body is positioned at the vibration point, the vibrator is controlled to vibrate. This allows the user to distinguish between the respective vibrations occurring in response to touch to the two regions.

Here, the region setting module may calculate an intersection point of the first region where a border of the first region intersects with the predicted track most downstream on the predicted track and an intersection point of the second region where a border of the second region intersects with the predicted track most upstream on the predicted track, the region setting module may calculate, as the distance between the first region and the second region on the predicted track, a distance between the intersection point of the first region and the intersection point of the second region, and when the distance is greater than a difference threshold value, the region setting module may set the intersection point of the second region as the vibration point.

According to this aspect, the distance, which is between the intersection point of the first region and the intersection point of the second region, is calculated. When the calculated distance is greater than the difference threshold value, the intersection point of the second region is set as the vibration point, and the vibrator is controlled to vibrate. In this case, there is a temporal interval between an end time of vibration occurring in response to touch to the first region and a start time of vibration occurring in response to touch to the second region. This allows the user to distinguish between the respective vibrations occurring in response to the two regions.

Here, when the distance is equal to or less than the difference threshold value, the region setting module may calculate, as the vibration point, a point resulting from moving the intersection point of the first region downstream on the predicted track by the difference threshold value.

According to this aspect, when the distance is equal to or less than the difference threshold value, which results from moving the intersection point of the first region downstream on the predicted track by the difference threshold value, is calculated as the vibration point. Accordingly, it is possible to provide a temporal interval between a start time point of vibration occurring in response to touch to the first region and an end time point of vibration occurring in response to touch to the second region.

Also, another aspect of the present invention provides a control method that is used in an input device that includes a vibrator and vibrates to inform a user of that an operation body touches a region on a screen, the region being for receiving an operation instruction allocated to the region, the control method comprising: repeatedly detecting a touch position on the screen touched by the operation body while the operation body is in touch with the screen; calculating a movement speed at each detected touch position, the movement speed indicating a speed at which the operation body moves on the screen while being in touch with the screen; comparing the movement speed at a touch position detected at a first time point with a threshold value, (i) when the movement speed is less than the threshold value, setting a first reaction region on the screen so as to be positioned anterior to the detected touch position in a movement direction of the operation body, and (ii) when the movement speed is equal to or greater than the threshold value, setting a second reaction region on the screen so as to be positioned anterior to the detected touch position in the movement direction, the second reaction region being smaller than the first reaction region; and judging whether the operation body is positioned inside the set reaction region, with use of a touch position detected at a second time point after the reaction region is set, when the operation body is positioned inside the set reaction region, controlling the vibrator to vibrate, and when the operation body is not positioned inside the set reaction region, controlling the vibrator not to vibrate.

The use of this method allows the user to distinguish between vibration occurring in response to touch to the second reaction region and an immediately previous vibration thereof.

Also, a further another aspect of the present invention provides a computer-readable recording medium having recorded therein a computer program for control that is used in an input device that includes a vibrator and vibrates to inform a user of that an operation body touches a region on a screen, the region being for receiving an operation instruction allocated to the region, the computer program causing the input device that is a computer to perform the steps of: repeatedly detecting a touch position on the screen touched by the operation body while the operation body is in touch with the screen; calculating a movement speed at each detected touch position, the movement speed indicating a speed at which the operation body moves on the screen while being in touch with the screen; comparing the movement speed at a touch position detected at a first time point with a threshold value, (i) when the movement speed is less than the threshold value, setting a first reaction region on the screen so as to be positioned anterior to the detected touch position in a movement direction of the operation body, and (ii) when the movement speed is equal to or greater than the threshold value, setting a second reaction region on the screen so as to be positioned anterior to the detected touch position in the movement direction, the second reaction region being smaller than the first reaction region; and judging whether the operation body is positioned inside the set reaction region, with use of a touch position detected at a second time point after the reaction region is set, when the operation body is positioned inside the set reaction region, controlling the vibrator to vibrate, and when the operation body is not positioned inside the set reaction region, controlling the vibrator not to vibrate.

According to this aspect, the user can distinguish between vibration occurring in response to touch to the second reaction region and an immediately previous vibration thereof.

Also, a yet another aspect of the present invention provides a mobile terminal device that vibrates to inform a user of that an operation body touches a region on a screen, the region being for receiving an operation instruction allocated to the region, the mobile terminal device comprising: a touch position detection module configured to repeatedly detect a touch position on the screen touched by the operation body while the operation body is in touch with the screen; a speed calculation module configured to calculate a movement speed at each detected touch position, the movement speed indicating a speed at which the operation body moves on the screen while being in touch with the screen; a vibrator; a region setting module configured to compare the movement speed at a touch position detected at a first time point with a threshold value, (i) when the movement speed is less than the threshold value, set a first reaction region on the screen so as to be positioned anterior to the detected touch position in a movement direction of the operation body, and (ii) when the movement speed is equal to or greater than the threshold value, set a second reaction region on the screen so as to be positioned anterior to the detected touch position in the movement direction, the second reaction region being smaller than the first reaction region; and a vibration control module configured to judge whether the operation body is positioned inside the set reaction region, with use of a touch position detected at a second time point after the reaction region is set, when the operation body is positioned inside the set reaction region, control the vibrator to vibrate, and when the operation body is not positioned inside the set reaction region, control the vibrator not to vibrate.

According to this aspect, the user can distinguish between vibration occurring in response to touch to the second reaction region and an immediately previous vibration thereof.

INDUSTRIAL APPLICABILITY

According to the input device relating to the present invention, when the touch movement speed of the operation body at a touch position is equal to or higher than the threshold value, the second reaction region, which is smaller than the first reaction region, is set on the operation screen so as to be positioned anterior to the touch position in the touch movement direction of the operation body. Also, when the operation body is positioned inside the second reaction region after the second reaction region is set, the vibrator vibrates. Accordingly, it is possible to provide a temporal interval between a start time point of vibration occurring in response to touch to the second reaction region and an end time point of an immediately previous vibration thereof. This allows the user to distinguish between the vibration occurring in response to touch to the second reaction region and the immediately previous vibration. Therefore, the input device relating to the present invention is useful as an art of vibrating to inform a user of that an operation body touches a region on an operation screen, the region being for receiving an operation instruction allocated to the region.

REFERENCE SIGNS LIST 100 mobile terminal device
101 antenna
102 communication circuit
103 audio processing unit
104 speaker
105 microphone
106 communication control unit
107 audio control unit
108 main control unit
109 input/output control unit
110 storage unit
111 touch panel
111a touch pad unit
111b display panel unit
111c region setting unit
111d speed calculation unit
111e vibration control unit
111f vibrator
111g region storage unit
112 button operation reception unit
113 power lamp

The invention claimed is:

1. An input device comprising:
a touch screen;
a vibrator;
a memory that stores initial region information indicating position and size of an initial region that corresponds to a reaction region; and
at least one processor configured to
repeatedly detect a touch position on the touch screen while an operation body is in contact with the touch screen,
calculate a movement speed at each detected touch position, the movement speed indicating a speed at which the operation body moves while being in contact with the touch screen,
compare the movement speed at a touch position detected at a first time point with a threshold value,
when the movement speed is less than the threshold value, set the initial region as the reaction region within a path in a movement direction of the operation body to have a first size,
when the movement speed is equal to or greater than the threshold value, set the reaction region to a sub-region of the initial region to have a second size that is smaller than the first size by,
when the movement speed is equal to or greater than the threshold value and is less than a sub threshold value, make a first reduction to the initial region, and set a region resulting from the first reduction as the reaction region, and,
when the movement speed is equal to or greater than the threshold value and is equal to or greater than the sub threshold value, make a second reduction to the initial region, and set a region resulting from the second reduction as the reaction region,
wherein the sub threshold value is greater than the threshold value, and the second reduction is greater in degree than the first reduction,
when the operation body is positioned inside the set reaction region, control the vibrator to vibrate, and,
when the operation body is not positioned inside the set reaction region, control the vibrator not to vibrate.

2. The input device according to claim 1, wherein the sub-region of the initial region comprises a portion of the initial region that is reduced anteriorly, posteriorly, or both anteriorly and posteriorly in the movement direction.

3. The input device according to claim 1, wherein the at least one processor sets a line segment resulting from the second reduction as the reaction region, the line segment being positioned inside the initial region and being perpendicular to the movement direction.

4. An input device comprising:
a touch screen;
a vibrator;
a memory that stores a plurality of pieces of initial region information each indicating position and size of one of a plurality of initial regions on the touch screen; and
at least one processor configured to
repeatedly detect a touch position on the touch screen while an operation body is in contact with the touch screen,
calculate a movement speed at each detected touch position, the movement speed indicating a speed at which the operation body moves while being in contact with the touch screen,
compare the movement speed at a touch position detected at a first time point with a threshold value,
when the movement speed is less than the threshold value, set a reaction region within a path in a movement direction of the operation body to have a first size,
when the movement speed is equal to or greater than the threshold value, set the reaction region to have a second size that is smaller than the first size,
when the operation body is positioned inside the set reaction region, control the vibrator to vibrate, and,
when the operation body is not positioned inside the set reaction region, control the vibrator not to vibrate,
wherein the-at least one processor is further configured to,
based on the plurality of pieces of initial region information, identify a first one of the plurality of regions and a second one of the plurality of regions that intersect with a predicted track of the operation body on the touch screen, wherein the second region is positioned farther along the predicted track than the first region,
calculate a distance between the first region and the second region on the predicted track,
determine a vibration point that is positioned inside the second region along the predicted track based on the calculated distance, and
set a beginning border of a reaction region, corresponding to the second region, along the predicted track at the vibration point.

5. The input device according to claim 4, wherein the at least one processor is configured to:
calculate an intersection point of the first region where a border of the first region intersects with the predicted track most downstream on the predicted track and an intersection point of the second region where a border of the second region intersects with the predicted track most upstream on the predicted track;

calculate, as the distance between the first region and the second region on the predicted track, a distance between the intersection point of the first region and the intersection point of the second region; and, when the distance is greater than a difference threshold value, set the intersection point of the second region as the vibration point.

6. The input device according to claim 5, wherein, when the distance is equal to or less than the difference threshold value, the at least one processor calculates, as the vibration point, a point resulting from moving the intersection point of the first region downstream on the predicted track by the difference threshold value.

7. A control method that is used in an input device that includes a touch screen and a vibrator, the control method comprising:

storing initial region information indicating position and size of an initial region that corresponds to a reaction region;

repeatedly detecting a touch position on the touch screen while an operation body is in contact with the touch screen;

calculating a movement speed at each detected touch position, the movement speed indicating a speed at which the operation body moves while being in contact with the touch screen;

comparing the movement speed at a touch position detected at a first time point with a threshold value;

when the movement speed is less than the threshold value, setting the initial region as the reaction region within a path in a movement direction of the operation body to have a first size;

when the movement speed is equal to or greater than the threshold value, setting the reaction region to a sub-region of the initial region to have a second size that is smaller than the first size by, when the movement speed is equal to or greater than the threshold value and is less than a sub threshold value, make a first reduction to the initial region, and set a region resulting from the first reduction as the reaction region, and, when the movement speed is equal to or greater than the threshold value and is equal to or greater than the sub threshold value, make a second reduction to the initial region, and set a region resulting from the second reduction as the reaction region, wherein the sub threshold value is greater than the threshold value, and the second reduction is greater in degree than the first reduction;

when the operation body is positioned inside the set reaction region, controlling the vibrator to vibrate; and, when the operation body is not positioned inside the set reaction region, controlling the vibrator not to vibrate.

8. A non-transitory computer-readable recording medium having recorded therein a computer program for control that is used in an input device that includes a touch panel and a vibrator, the computer program causing the input device that is a computer to perform:

storing initial region information indicating position and size of an initial region that corresponds to a reaction region;

repeatedly detecting a touch position on the touch screen while an operation body is in contact with the touch screen;

calculating a movement speed at each detected touch position, the movement speed indicating a speed at which the operation body moves while being in contact with the touch screen;

comparing the movement speed at a touch position detected at a first time point with a threshold value;

when the movement speed is less than the threshold value, setting the initial region as the reaction region within a path in a movement direction of the operation body to have a first size;

when the movement speed is equal to or greater than the threshold value, setting the reaction region to a sub-region of the initial region to have a second size that is smaller than the first size by, when the movement speed is equal to or greater than the threshold value and is less than a sub threshold value, make a first reduction to the initial region, and set a region resulting from the first reduction as the reaction region, and, when the movement speed is equal to or greater than the threshold value and is equal to or greater than the sub threshold value, make a second reduction to the initial region, and set a region resulting from the second reduction as the reaction region, wherein the sub threshold value is greater than the threshold value, and the second reduction is greater in degree than the first reduction;

when the operation body is positioned inside the set reaction region, controlling the vibrator to vibrate; and, when the operation body is not positioned inside the set reaction region, controlling the vibrator not to vibrate.

\* \* \* \* \*